US012551908B2

(12) United States Patent
Li et al.

(10) Patent No.: US 12,551,908 B2
(45) Date of Patent: Feb. 17, 2026

(54) ELECTROSTATIC NOZZLE AND CONTROLLABLE JET MINIMAL QUANTITY LUBRICATION GRINDING SYSTEM

(71) Applicants: Qingdao University of Technology, Qingdao (CN); Liaoning University of Technology, Jinzhou (CN); QINGDAO HUANGHAI UNIVERSITY, Qingdao (CN); Qingdao Jimo Qingli intelligent manufacturing industry Research Institute, Qingdao (CN)

(72) Inventors: Changhe Li, Qingdao (CN); Dongzhou Jia, Qingdao (CN); Huajun Cao, Qingdao (CN); Xuefeng Xu, Qingdao (CN); Zhiguang Han, Qingdao (CN); Naiqing Zhang, Qingdao (CN); Huayang Zhao, Qingdao (CN); Min Yang, Qingdao (CN); Yanbin Zhang, Qingdao (CN); Xiaoming Wang, Qingdao (CN); Runze Li, Qingdao (CN); Teng Gao, Qingdao (CN); Wentao Wu, Qingdao (CN); Xin Cui, Qingdao (CN); Yali Hou, Qingdao (CN)

(73) Assignees: Qingdao University of Technology, Qingdao (CN); Liaoning University of Technology, Jinzhou (CN); QINGDAO HUANGHAI UNIVERSITY, Qingdao (CN); Qingdao Jimo Qingli Intelligent manufacturing industry Research Institute, Qingdao (CN)

( * ) Notice: Subject to any disclaimer, the term of this patent is extended or adjusted under 35 U.S.C. 154(b) by 843 days.

(21) Appl. No.: 17/819,328

(22) Filed: Aug. 12, 2022

(65) Prior Publication Data
US 2023/0001433 A1 Jan. 5, 2023

Related U.S. Application Data

(62) Division of application No. 16/744,146, filed on Jan. 15, 2020, now abandoned.

(30) Foreign Application Priority Data

Mar. 5, 2019 (CN) .......................... 201910164150.9

(51) Int. Cl.
*B05B 5/03* (2006.01)
*B05B 5/025* (2006.01)
(Continued)

(52) U.S. Cl.
CPC .............. *B05B 5/03* (2013.01); *B05B 5/0255* (2013.01); *B05B 5/043* (2013.01); *B05B 5/1608* (2013.01); *B24B 55/02* (2013.01); *B05B 5/0533* (2013.01)

(58) Field of Classification Search
CPC ....... B05B 7/0056; B05B 7/0068; B05B 5/03; B05B 5/0255; B05B 5/043; B05B 5/0533; B05B 5/1608; B24B 55/02
See application file for complete search history.

(56) References Cited

U.S. PATENT DOCUMENTS 2,183,561 A * 12/1939 Hamblin ............... B05B 7/0025
261/DIG. 26
2,990,165 A * 6/1961 Joseph .............. B01F 25/31112
261/DIG. 26
(Continued)

FOREIGN PATENT DOCUMENTS

CN 202447217 U 9/2012
CN 207239986 U 4/2018

*Primary Examiner* — Cody J Lieuwen

(57) ABSTRACT

The present disclosure provides an electrostatic nozzle and a controllable jet minimal quantity lubrication (MQL) grind-
(Continued)

ing system. The electrostatic nozzle comprises a nozzle core; an upper nozzle body is connected above the nozzle core; a free space is formed between the upper nozzle body and the nozzle core for storing compressed air and reducing pressure; a lower nozzle body is connected below the nozzle core; a gas-liquid mixing chamber, an acceleration chamber and a nozzle outlet are sequentially arranged inside the nozzle core from top to bottom; and micro-bulges are uniformly distributed on an inner wall of the acceleration chamber.

10 Claims, 9 Drawing Sheets

(51) Int. Cl.
*B05B 5/043* (2006.01)
*B05B 5/16* (2006.01)
*B24B 55/02* (2006.01)
*B05B 5/053* (2006.01)

(56) References Cited

U.S. PATENT DOCUMENTS

| | | | |
|---|---|---|---|
| 4,664,315 A | | 5/1987 | Parmentar et al. |
| 4,944,460 A | * | 7/1990 | Steingass ............... B05B 7/0068 |
| | | | 169/89 |
| 7,513,489 B2 | * | 4/2009 | DeLisle ............. F02M 51/0682 |
| | | | 261/78.2 |
| 9,511,478 B2 | | 12/2016 | Li et al. |
| 2015/0126097 A1 | * | 5/2015 | Li ............................ B05B 7/10 |
| | | | 451/450 |
| 2017/0120419 A1 | | 5/2017 | Li et al. |

* cited by examiner

000
ELECTROSTATIC NOZZLE AND CONTROLLABLE JET MINIMAL QUANTITY LUBRICATION GRINDING SYSTEM

CROSS-REFERENCE TO RELATED APPLICATIONS

This is a divisional application of co-pending application Ser. No. 16/744,146, filed on Jan. 15, 2020, which claims priority to Chinese Patent Application No. 201910164150.9 with a filing date of Mar. 5, 2019. The content of the aforementioned applications, including any intervening amendments thereto, are incorporated herein by reference.

TECHNICAL FIELD

The present disclosure belongs to the field of grinding fluid supply devices in machining, and particularly relates to an electrostatic nozzle and a controllable jet minimal quantity lubrication (MQL) grinding system.

BACKGROUND OF THE PRESENT INVENTION

Statements in this part merely provide background information related to the present disclosure and do not necessarily constitute the prior art.

Minimal quantity lubrication technology is also called MQL technology, which specifically means that a trace amount of grinding fluid and compressed air with certain pressure are mixed and atomized, and then are sprayed to a grinding region for effectively lubricating chips, grinding wheels and machining surfaces. The technology can minimize the usage of the grinding fluid (which is about a thousandth of the usage of a traditional pouring type lubrication mode) on the premise of ensuring effective lubrication and cooling effect, thereby reducing production cost, environmental pollution and damage to human bodies.

Nano-jet MQL is established based on the theory of heat transfer enhancement. The theory of heat transfer enhancement shows that the heat transfer capacity of solid is much higher than that of liquid and gas. A thermal conductivity coefficient of solid materials is several orders of magnitude higher than that of fluid materials at room temperature. Solid particles can be added into an MQL medium to significantly increase the thermal conductivity coefficient of a fluid medium, improve the convective heat transfer capacity, and greatly make up for a defect of insufficient cooling capacity of MQL. In addition, nanoparticles also have special tribological characteristics in lubrication and tribology, such as wear resistance and friction reduction as well as high bearing capacity. Nano-jet MQL means that nano-solid particles are added into the MQL fluid medium to prepare a nanofluid, i.e., nanoparticles, a lubricant (oil or an oil-water mixture) and a high-pressure gas are mixed and atomized and then sprayed into the grinding region in the form of jet.

Droplets produced by a nanofluid minimal quantity lubrication (NMQL) technology enter the grinding region under the carrying action of high-pressure gas to play the roles of cooling and lubrication. However, movement paths of the droplets are uncontrollable, and problems of droplet diffusion, drift and the like exist. Droplets drift into the working environment, thereby not only polluting the environment, but also threatening health of operators and reducing an effective utilization rate of the grinding fluid at the same time, and causing waste of resources. Nowadays, influences of lubrication liquid and cooling fluid on the health of operators when machining with MQL are attracting much attention. For example, operators will suffer from various respiratory diseases, comprising occupational asthma, allergic pneumonia, loss of lung function, and skin diseases such as allergy, oil acne and skin cancer. To solve the realistic problem, researchers proposed electrostatic atomization MQL through a lot of exploration work, and hoped to realize controllable transportation of atomized droplets and further improve an atomization effect through the action of electric field force.

The patent having an application number of 201310042095.9 discloses a nanofluid electrostatic atomization controllable jet MQL grinding system. In the solution, a corona charging technology is adopted to charge the MQL liquid at a nozzle outlet; the droplets will be further broken up under the action of a high-voltage electric field; and small droplets formed by breakup will be controllably conveyed to the grinding region along a direction of an electric field line, thereby effectively cooling and lubricating the grinding region. The patent having an application number of 201310050221.5 discloses a cutting fluid aerosol MQL method. In the solution, a corona discharging principle is also adopted to break up and transport the lubrication liquid.

The inventors found that there are few technologies for lubrication with electrostatic atomization in the field of machining in currently published literatures and the technologies are not yet mature. At present, a mode of corona discharge (discharge at a tip of an electrode needle) is mostly used for charge transportation of lubrication oil. However, corona discharge has problems of small corona region and poor chargeability, which causes waste of energy while increasing use voltage. Contact charge (direct contact of a high-voltage power supply with a nozzle) can effectively increase the charge quantity of the lubrication liquid, but has a risk of electricity leakage. At present, MQL equipment suitable for contract charge does not appear on the market. In fact, the MQL liquid at the nozzle outlet is stretched into a series of small liquid columns under the action of external forces such as the compressed air and the electric field force and then is broken up into droplets when the contact charge is used. The liquid columns have extremely uneven diameters in such a process, so that the particle size distribution of the subsequently formed small droplets is relatively dispersed, which is not conducive to the controllability of droplet size. Meanwhile, the small liquid columns at the nozzle outlet severely fluctuate under the action of turbulent flow formed by the compressed air, which is very unfavorable to the control of subsequent conveying routes of the droplets.

Besides the above problems, the inventors also found that noise will be made when the compressed air is sprayed out from the nozzle due to relatively high pressure of the compressed air, and the noise will affect hearing heath of the operators. In addition, it was found in the grinding system using MQL that a pipeline for conveying nanofluids was often blocked due to strong adsorption performance of nanoparticles, which greatly affects use performance of the grinding system and is also a problem urgent to be solved in the electrostatic atomization MQL system.

SUMMARY OF PRESENT INVENTION

A first aspect of the present disclosure provides a microtexture electrostatic nozzle, wherein a series of micro-bulges are arranged on an inner side surface of an acceleration chamber to greatly improve oleophilic performance of the inner surface of the acceleration chamber.

The technical solution of the micro-texture electrostatic nozzle in the first aspect of the present disclosure is as follows:

The micro-texture electrostatic nozzle comprises a nozzle core, wherein an upper nozzle body is connected above the nozzle core; a free space is formed between the upper nozzle body and the nozzle core for storing compressed air and reducing pressure; a lower nozzle body is connected below the nozzle core; a gas-liquid mixing chamber, an acceleration chamber and a nozzle outlet are sequentially arranged inside the nozzle core from top to bottom; and micro-bulges are uniformly distributed on an inner wall of the acceleration chamber.

A second aspect of the present disclosure provides a two-stage composite micro-texture electrostatic nozzle, wherein a series of micro-bulges are arranged on an inner side surface of an acceleration chamber; the micro-bulges are two-stage composite structures composed of first-stage micro-bulges and second-stage micro-bulges; and compared with an individual micro-bulge structure, the composite micro-bulges will undoubtedly improve oleophilic performance of the inner surface of the acceleration chamber more greatly.

The technical solution of the two-stage composite micro-texture electrostatic nozzle in the second aspect of the present disclosure is as follows:

The two-stage composite micro-texture electrostatic nozzle comprises a nozzle core, wherein an upper nozzle body is connected above the nozzle core; a free space is formed between the upper nozzle body and the nozzle core for storing compressed air and reducing pressure; a lower nozzle body is connected below the nozzle core; a gas-liquid mixing chamber, an acceleration chamber and a nozzle outlet are sequentially arranged inside the nozzle core from top to bottom; micro-bulges are uniformly distributed on an inner wall of the acceleration chamber; the micro-bulges are composed of first-stage micro-bulges and second-stage micro-bulges; and the first micro-bulges are arranged on the second-stage micro-bulges.

A third aspect of the present disclosure provides a noise-reducing and resistance-increasing electrostatic nozzle, wherein a series of conical strip-shaped micro-bulges are arranged on an inner side surface of an acceleration chamber; conical strip-shaped grooves formed between the conical strip-shaped micro-bulges can effectively reduce noise, thereby reducing harm to hearing health of operators; and a series of micro-bulges arranged on the inner side surface of the acceleration chamber also greatly increase a contact area between the nozzle core and MQL liquid.

The technical solution of the noise-reducing and resistance-increasing electrostatic nozzle in the third aspect of the present disclosure is as follows:

The noise-reducing and resistance-increasing electrostatic nozzle comprises a nozzle core, wherein an upper nozzle body is connected above the nozzle core; a free space is formed between the upper nozzle body and the nozzle core for storing compressed air and reducing pressure; a lower nozzle body is connected below the nozzle core; a gas-liquid mixing chamber, an acceleration chamber and a nozzle outlet are sequentially arranged inside the nozzle core from top to bottom; micro-bulges are uniformly distributed on an inner wall of the acceleration chamber; the micro-bulges are of a conical strip shape; and a conical strip-shaped groove is formed between any two conical strip-shaped micro-bulges.

A fourth aspect of the present disclosure provides a gradient micro-bulge contact type electrostatic nozzle, wherein a series of transitional non-contour micro-bulges are arranged on an inner side surface of an acceleration chamber; the adoption of the transitional micro-bulges enables movement resistance of the MQL liquid in the acceleration chamber to be distributed from large to small, which is conducive to forming a uniform oil film under a pulling effect of the compressed air and also greatly reducing disturbance of jet and improves uniformity of liquid lines of a liquid film, so that the finally formed droplets are distributed more uniformly and movement paths of the droplets are more controllable.

The technical solution of the gradient micro-bulge contact type electrostatic nozzle in the fourth aspect of the present disclosure is as follows:

The gradient micro-bulge contact type electrostatic nozzle comprises a nozzle core, wherein an upper nozzle body is connected above the nozzle core; a free space is formed between the upper nozzle body and the nozzle core for storing compressed air and reducing pressure; a lower nozzle body is connected below the nozzle core; a gas-liquid mixing chamber, an acceleration chamber and a nozzle outlet are sequentially arranged inside the nozzle core from top to bottom; micro-bulges are uniformly distributed on an inner wall of the acceleration chamber; and the micro-bulges adopt a transitional non-contour structure, i.e., heights of the micro-bulges gradually decrease along a movement direction of jet.

A fifth aspect of the present disclosure provides a controllable jet MQL grinding system, which comprises an electrostatic nozzle, wherein the electrostatic nozzle is adopted to charge lubrication liquid; and the controllable jet MQL grinding system realizes controllable distribution of spray droplets and can also improve chargeability and uniformity of droplets.

The technical solution of the controllable jet MQL grinding system in the fifth aspect of the present disclosure is as follows:

In one or more embodiments, the controllable jet MQL grinding system comprises the micro-texture electrostatic nozzle described above.

In one or more embodiments, the controllable jet MQL grinding system comprises the two-stage composite micro-texture electrostatic nozzle described above.

In one or more embodiments, the controllable jet MQL grinding system comprises the noise-reducing and resistance-increasing electrostatic nozzle described above.

In one or more embodiments, the controllable jet MQL grinding system comprises the gradient micro-bulge contact type electrostatic nozzle.

The present disclosure has beneficial effects as follows.

(1) In the micro-texture electrostatic nozzle of the present disclosure, a series of micro-bulges are arranged on the inner side surface of the acceleration chamber to greatly improve the oleophilic performance of the inner surface of the acceleration chamber; the inner surface of the acceleration chamber can effectively adsorb MQL liquid flowing out of the mixing chamber due to the oleophilic performance, thereby improving the movement resistance of the MQL liquid, forming the uniform oil film under the pulling effect of the compressed air, greatly reducing the disturbance of jet and improving the uniformity of the liquid lines of the liquid film, so that the finally formed droplets are distributed more uniformly and the movement paths of the droplets are more controllable; and a series of micro-bulges arranged on the inner side surface of the acceleration chamber greatly increase the contact area between the nozzle core and the MQL liquid, and also greatly increase the contact time between the MQL liquid and the micro-bulges due to better oleophilic performance, thereby having more ideal charging performance.

(2) In the two-stage composite micro-texture electrostatic nozzle of the present disclosure, a series of micro-convex bodies are arranged on the inner side surface of the acceleration chamber; the micro-bulges are two-stage composite structures composed of first-stage micro-bulges and second-stage micro-bulges; and compared with the individual micro-bulge structure, the composite micro-bulges will undoubtedly improve the oleophilic performance of the inner surface of the acceleration chamber more greatly; the inner surface of the acceleration chamber can effectively adsorb MQL liquid flowing out of the mixing chamber due to the oleophilic performance, thereby improving the movement resistance of the MQL liquid, forming the uniform oil film under the pulling effect of the compressed air, greatly reducing the disturbance of jet and improving the uniformity of the liquid lines of the liquid film, so that the finally formed droplets are distributed more uniformly and the movement paths of the droplets are more controllable; and a series of two-stage composite micro-bulges arranged on the inner side surface of the acceleration chamber greatly increase the contact area between the nozzle core and the MQL liquid, and also greatly increase the contact time between the MQL liquid and the micro-bulges due to better oleophilic performance, thereby having more ideal charging performance.

(3) In the noise-reducing and resistance-increasing electrostatic nozzle of the present disclosure, a series of conical strip-shaped micro-bulges are arranged on the inner side surface of the acceleration chamber to greatly improve the oleophilic performance of the inner surface of the acceleration chamber; the inner surface of the acceleration chamber can effectively adsorb MQL liquid flowing out of the mixing chamber due to the oleophilic performance, thereby improving the movement resistance of the MQL liquid, forming the uniform oil film under the pulling effect of the compressed air, greatly reducing the disturbance of jet and improving the uniformity of the liquid lines of the liquid film, so that the finally formed droplets are distributed more uniformly and the movement paths of the droplets are more controllable; meanwhile, the conical strip-shaped grooves formed between the conical strip-shaped micro-bulges can effectively reduce noise, thereby reducing harm to the hearing health of the operators; and a series of micro-bulges arranged on the inner side surface of the acceleration chamber also greatly increase the contact area between the nozzle core and the MQL liquid, and also greatly increase the contact time between the MQL liquid and the micro-bulges due to the better oleophilic performance, thereby having more ideal charging performance.

(4) In the gradient micro-bulge contact type electrostatic nozzle of the present disclosure, a series of transitional non-contour micro-bulges are arranged on the inner side surface of the acceleration chamber; the adoption of the transitional micro-bulges enables the movement resistance of the MQL liquid in the acceleration chamber to be distributed from large to small, which is conducive to forming the uniform oil film under the pulling effect of the compressed air and also greatly reducing the disturbance of jet and improves the uniformity of the liquid lines of the liquid film, so that the finally formed droplets are distributed more uniformly and the movement paths of the droplets are more controllable; a series of micro-bulges arranged on the inner side surface of the acceleration chamber also greatly increase the contact area between the nozzle core and the MQL liquid, and also greatly increase the contact time between the MQL liquid and the micro-bulges due to the better oleophilic performance, thereby having more ideal charging performance.

(5) The controllable jet MQL grinding system of the present disclosure adopts the electrostatic nozzle to greatly increase the contact time between the MQL liquid and the electrostatic nozzle; moreover, a hydrophobic oleophobic carbon nano-coating is coated inside an insulation oil pipe; and adsorbed gas molecules can stably exist on a nanoscale concave surface, so that a macro-surface equivalently has a stable gas film, oil and water cannot directly contact with surfaces of materials, and the surfaces of the materials present extraordinary amphiphobic (oleophobic and hydrophobic) properties, thereby effectively avoiding a problem of blockage of the oil pipe.

DESCRIPTION OF THE DRAWINGS

The drawings of description that form a part of the present disclosure are adopted to provide a further understanding for the present disclosure. Exemplary embodiments of the present disclosure and descriptions thereof are intended to illustrate the present disclosure, rather than improperly limit the present disclosure.

In the figures, 1—grinding machine part workbench, 2—insulation plate, 3—workpiece, 4—grinding wheel, 5—grinding wheel cover, 6—magnetic chuck, 7—MQL liquid conveying pipe, 8—DC high-voltage wire, 9—adjustable high-voltage DC power supply, 10—electrostatic nozzle, 11—box body, 12—insulation oil cup connector, 13—insulation oil cup, 14—insulation fixing bolt, 15—insulation washer, 16—insulation connecting bolt, 17—micro-pump fixing plate, 18—precise MQL pump, 19—air flow adjustment knob, 20—insulation tee, 21—electromagnetic valve, 22—filter pressure-adjusting valve, 23—air source connector, 24—bidirectional connector, 25—pulse controller, 26—air pipe I, 27—air pipe II, 28—air pipe III, 29—liquid flow adjustment knob, 30—gas-liquid outlet connector, 31—electromagnetic valve mounting frame, 32—lubrication pump air inlet interface I, 33—lubrication pump air inlet interface II, 34—MQL liquid conveying pipe outlet hole, 35—oil cup cover, 36—box cover, 37—insulation coil pipe, 38—insulation oil pipe, 39—gas conveying cavity, 40—hydrophobic and oleophobic carbon nano-coating, 41—liquid conveying cavity, 42—upper nozzle body, 43—lower nozzle body, 44—insulation sealing ring, 45—nozzle core, 46—annular check ring, 47—MQL liquid conveying pipe interface, 48—air storage chamber, 49—spiral air hole, 50—gas-liquid mixing chamber, 51—acceleration chamber, 52—nozzle outlet, 53—high-voltage wire interface, 54—high-voltage wire outlet through hole, 55—check ring placement groove, 56—$V_2O_5$ nanofiber sheet, 57—micro-bulge, 58—workpiece power-up device, 59—insulation housing, 60—iron weight, 61—permanent magnet, 62—cotter pin slot, 63—wiring ring, 64—compression spring, 65—first-stage micro-bulge, and 66—second-stage micro-bulge.

DETAILED DESCRIPTION OF PREFERRED EMBODIMENTS

It should be noted that the following detailed illustration is exemplary and is intended to provide further explanation for the present disclosure. Unless otherwise specified, all technical and scientific terms used herein have the same meanings as commonly understood by those ordinary skilled in the art to which the present disclosure belongs.

It should be noted that the terms used herein are intended to describe specific embodiments only, rather than limit exemplary embodiments according to the present disclosure. As used herein, the singular form is also intended to comprise the plural form unless otherwise clearly specified in the context. In addition, it should be understood that the terms "contain" and/or "comprise" used in the present description indicate the presence of features, steps, operations, devices, components and/or combinations thereof.

Embodiment 1

Figure 1A:
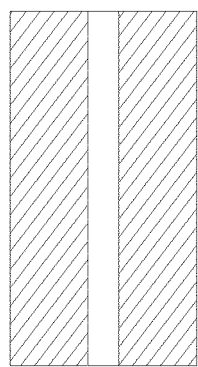
FIG. 1(a) is a cylindrical nozzle provided by an embodiment of the present disclosure.
Figure 1B:
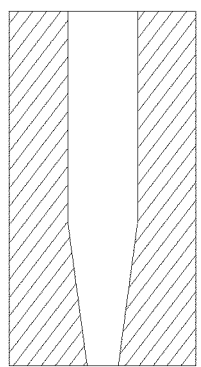
FIG. 1(b) is a conical nozzle provided by an embodiment of the present disclosure.
Figure 1C:
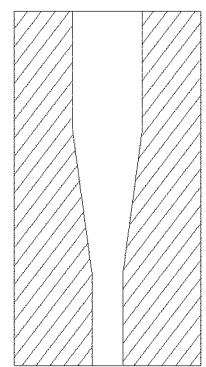
FIG. 1(c) is a conical column-shaped nozzle provided by an embodiment of the present disclosure.
Figure 1D:
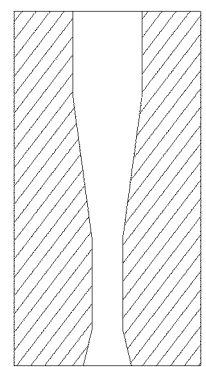
FIG. 1(d) is a conical column diverging nozzle provided by an embodiment of the present disclosure.

As shown in FIGS. 1(a)-1(d), a current injection nozzle structure has a cylindrical nozzle as shown in FIG. 1(a), a conical nozzle as shown in FIG. 1(b), a conical column-shaped nozzle as shown in FIG. 1(c) and a conical column diverging nozzle as shown in FIG. 1(d). The nozzle has relatively high requirements for velocity distribution and turbulence intensity of jet. The design of the nozzle requires that the jet velocity is relatively uniform, a velocity gradient is not easy to be too large, the turbulence intensity of the jet is low, the jet is not easy to have relatively large fluctuations, the concentration distribution of droplets at a nozzle outlet is uniform, and a concentration gradient of the jet is not easy to be too large. According to research experience of relevant workers, under the same inlet and outlet conditions, in velocity distribution, the velocity distribution at an outlet of the cylindrical nozzle is the most uneven, the central velocity distribution is greatly different from the boundary velocity distribution, the velocity distribution at the outlet of the conical column diverging nozzle is the most uniform, and the velocity distribution of the conical column diverging nozzle is stronger than that of the conical nozzle. In turbulence intensity, the turbulence intensity of the conical column diverging nozzle is the largest, and the turbulence intensity of the conical column diverging nozzle is between the cylindrical nozzle and the conical nozzle. In concentration distribution of the droplets at the nozzle outlet, the concentration distribution of the droplets at the outlet of the conical nozzle is the most uniform.

In conclusion, the conical column-shaped nozzle has a relatively uniform velocity distribution at the outlet, a relatively small turbulence intensity distribution at the outlet and the most uniform concentration distribution of the droplets at the outlet. Therefore, the conical column-shaped nozzle, i.e., such a nozzle as shown in FIG. 1(c), is adopted in the present embodiment according to requirements on jet characteristics.

Figure 2:
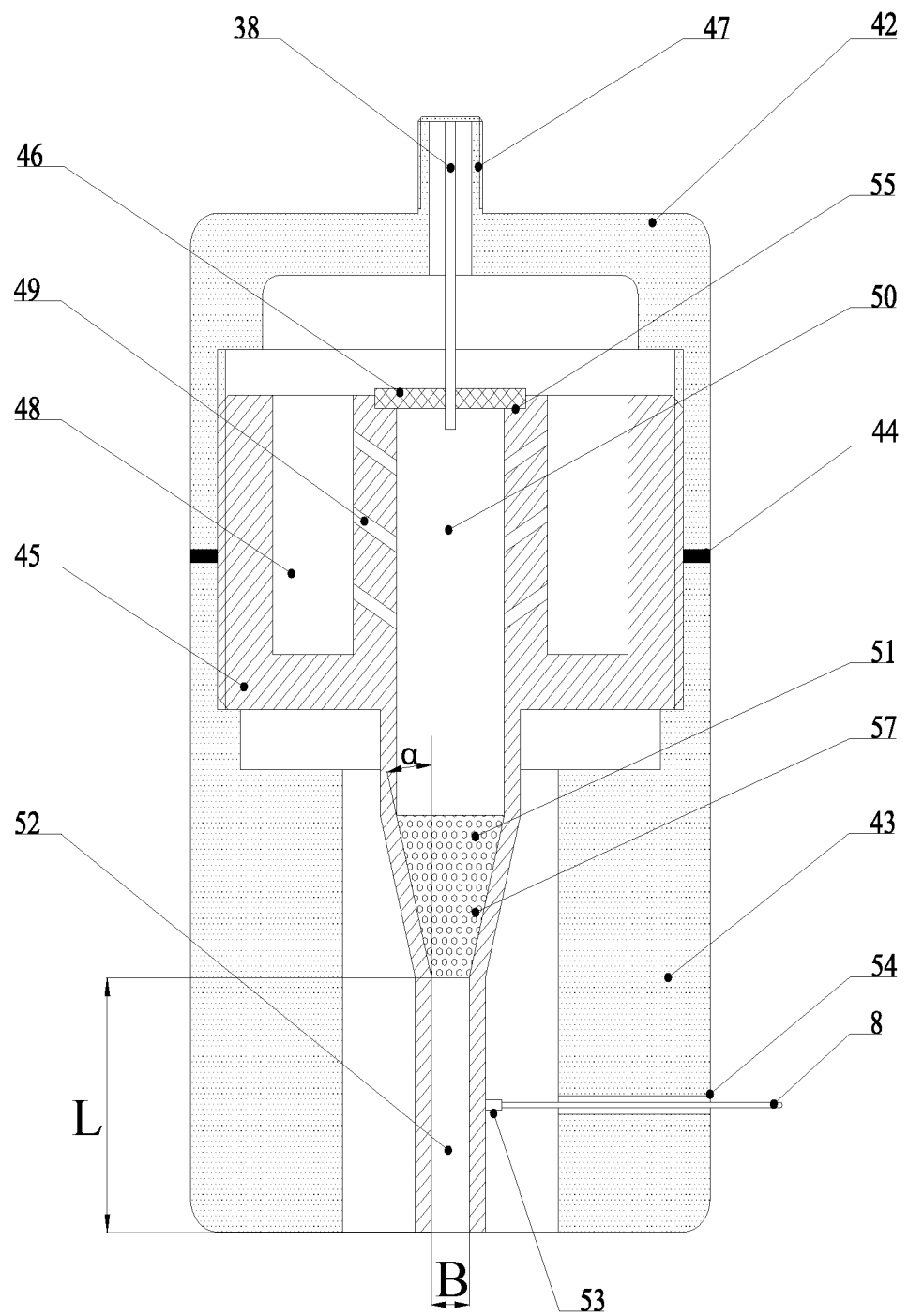
FIG. 2 is a sectional view of a general assembly of an electrostatic nozzle provided by an embodiment of the present disclosure.
Figure 3:
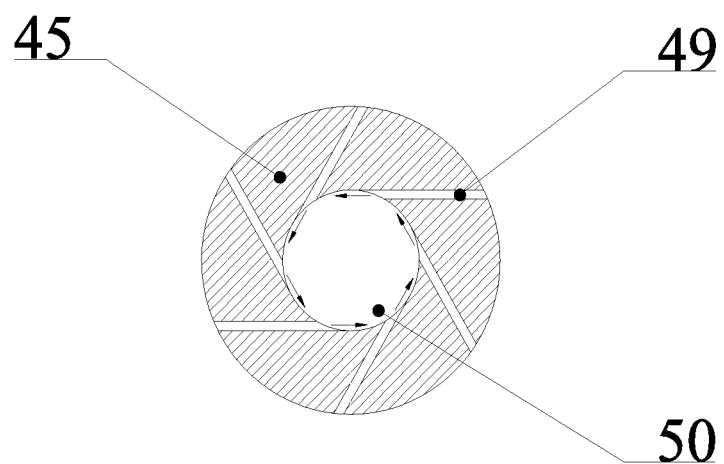
FIG. 3 is a sectional view of a spiral air hole of a nozzle provided by an embodiment of the present disclosure.
Figure 4:
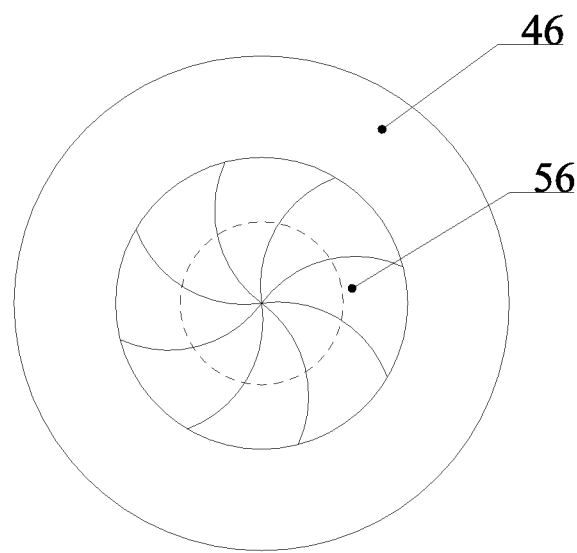
FIG. 4 is a structural schematic diagram of a mixing chamber sealing cover provided by an embodiment of the present disclosure.

As shown in FIGS. 2, 3 and 4, a micro-texture electrostatic nozzle according to the present embodiment comprises an upper nozzle body 42, a lower nozzle body 43, an insulation sealing ring 44, a nozzle core 45, an annular check ring 46, an MQL liquid conveying pipe interface 47, an air storage chamber 48, spiral air holes 49, a gas-liquid mixing chamber 50, an acceleration chamber 51, a nozzle outlet 52, a high-voltage wire interface 53, a high-voltage wire outlet through hole 54, a check ring placement groove 55, $V_2O_5$ nanofiber sheets 56 and micro-bulges 57.

The upper nozzle body 42 is connected above the nozzle core through threads; the lower nozzle body 43 is connected below the nozzle core 45 through threads; and the insulation sealing ring 44 is arranged between the upper nozzle body 42 and the lower nozzle body 43 and can effectively prevent gas in the nozzle from leaking. The upper nozzle body 42 and the lower nozzle body 43 are made of insulation materials; and the nozzle core 45 is made of a metal conductive material. The MQL liquid conveying pipe interface 47 is arranged above the upper nozzle body 42 and can be connected with an insulation coil pipe 37 through threads; therefore, compressed air flowing through the insulation coil pipe 37 can enter the electrostatic nozzle. The air storage chamber 48 is arranged in the nozzle core 45, plays the roles of storing the compressed air and reducing pressure, and plays the same role as a free space formed between the upper nozzle body 42 and the nozzle core 45. The gas-liquid mixing chamber 50, the acceleration chamber 51 and the nozzle outlet 52 are sequentially arranged inside the nozzle core 45 from top to bottom. A contraction angle α of the acceleration chamber 51 is between 5° and 20°; the nozzle outlet has a diameter of B and a length of L; a value of L/B is between 2 and 6; and α is 13°, B is 1 mm, and L/B is 4 in the present embodiment.

The check ring placement groove 55 is arranged above the nozzle core 45; and the annular check ring 46 is fixedly bonded in a groove of the check ring placement groove 55. The annular check ring 46 is an insulation annular rubber ring with elasticity; 4-10 $V_2O_5$ nanofiber sheets 56 are distributed on the annular check ring 46 in a form of arrays; and 8 sheets are taken for example in FIG. 3. The $V_2O_5$ nanofiber sheets 56 are pasted around the annular check ring 46 by one circle to cover an annular central hole; the insulation oil pipe 38 penetrates through centers of a plurality of $V_2O_5$ nanofiber sheets 56 and enters the gas-liquid mixing chamber 50; the $V_2O_5$ nanofiber sheets 56 have special properties, can perform strong reversible contraction similar to muscle under the action of an external electric field, and can tightly wrap the insulation oil pipe 38 to avoid the backflow of airflow and lubrication liquid caused by the airflow in the gas-liquid mixing chamber 50. The annular check ring 46 has certain elasticity, and has the amount of elastic deformation capable of counteracting the amount of contraction of the $V_2O_5$ nanofiber sheets 56. The spiral air holes 49 are formed in the nozzle core 45 and are distributed along an outer wall of the gas-liquid mixing chamber 50 in the form of arrays. An inlet axis is tangent to a wall surface of an inner cavity of the gas-liquid mixing chamber 50. The compressed air flows through the spiral air holes 49 and enters the gas-liquid mixing chamber 50 at a tangential velocity v. The compressed air enters the gas-liquid mixing chamber 50 through a plurality of spiral air holes 49 at the same time, and a speed direction of the compressed air does not intersect with an axial center. As a result, the incoming airflow has a moment of momentum to the axial center, which prompts the airflow to rotate about the axial center in the gas-liquid mixing chamber 50 and simultaneously propels the airflow toward the direction of the nozzle outlet, thereby driving the nanofluid to rotate to form vortex. The vortex is formed so that the MQL liquid is fully mixed with the compressed air and turbulent flow is also formed at the same time. The acceleration chamber 51 and the nozzle outlet 52 are mainly used for acceleration of jet and spreading of the lubrication liquid in the nozzle. The lubrication liquid is usually pulled into a liquid film or a liquid line in the nozzle and at the outlet, and finally is broken up into droplets under the action of external forces such as aerodynamic force and electrostatic force. The high-voltage wire interface 53 is arranged on the nozzle core 45; the high-voltage wire outlet through hole 54 is formed in the lower nozzle body 43; and a DC high-voltage wire 8 can penetrate through the high-voltage wire outlet through hole 54 to be connected with the high-voltage wire interface 53 so as to supply power to the nozzle core 45. A series of micro-bulges 57 are arranged on the inner wall of the acceleration chamber 51. Specific shapes and positions of the micro-bulges 57 are as shown in FIG. 6.

Figure 5A:
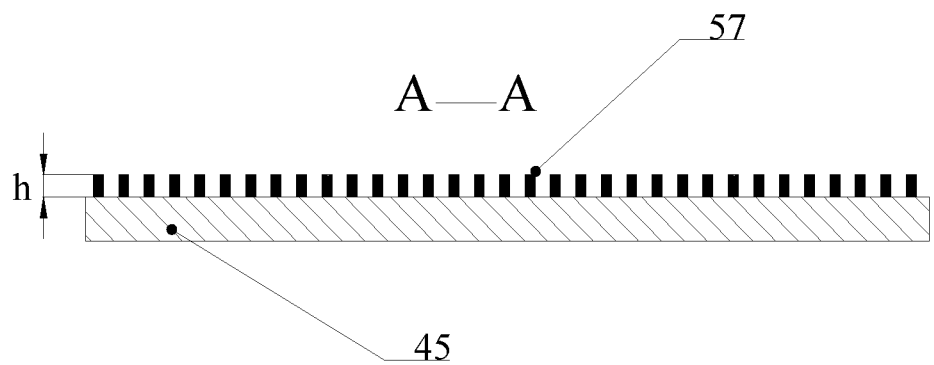
FIG. 5(a) is a schematic diagram of distribution of a micro-texture unfolded on an inner surface of an acceleration chamber of a micro-texture electrostatic nozzle provided by an embodiment of the present disclosure.
Figure 5B:
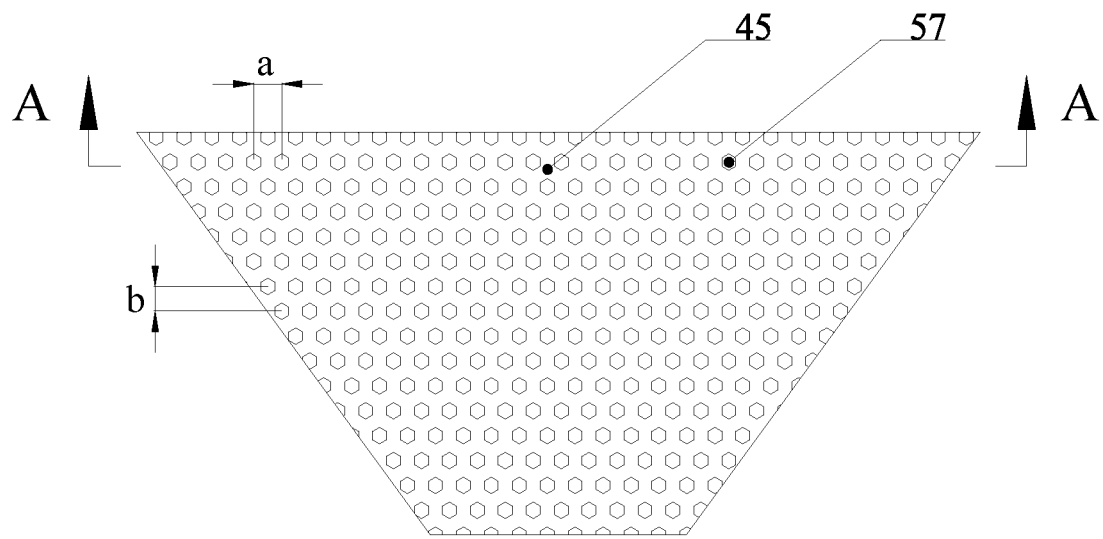
FIG. 5(b) is a schematic diagram of distribution of a micro-texture unfolded on an inner surface of an acceleration chamber of a micro-texture electrostatic nozzle provided by an embodiment of the present disclosure.
Figure 6:
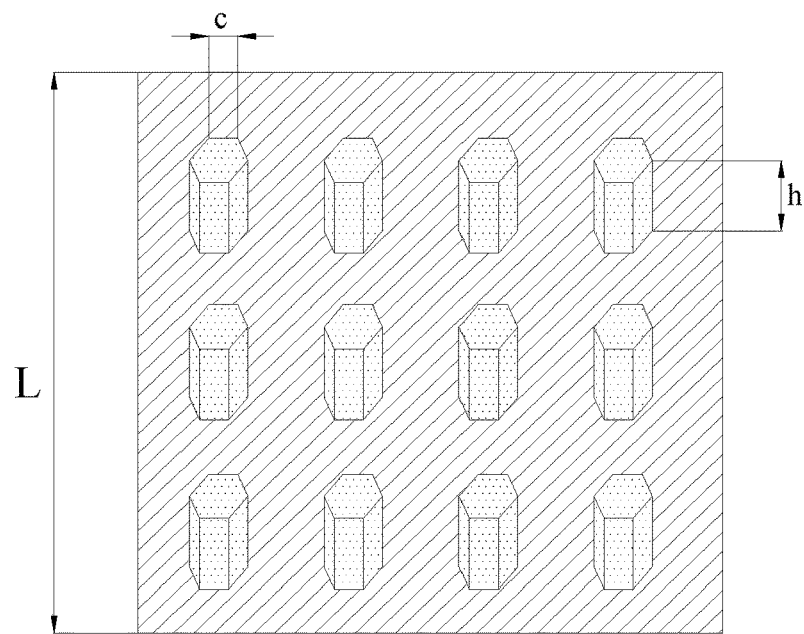
FIG. 6 is a structural schematic diagram of a unit area of a micro-texture unfolded on an inner surface of an acceleration chamber of a micro-texture electrostatic nozzle provided by an embodiment of the present disclosure.

As shown in FIGS. 5(a)-6, the micro-bulges 57 are uniformly distributed on the inner wall of the acceleration chamber 51. The micro-bulges are hexagonal prisms in the present embodiment, and similarly, the micro-bulges 57 may be cylinders, cones or polygonal prisms. Various micro-bulges 57 have a horizontal center distance a of 5-50 μm, a vertical center distance b of 5-50 μm, a side length c of 2-7 μm, a height h of 3-30 μm and an area occupation ratio η (i.e., a ratio of a projected area of all the micro-bulges 57 to an area of the inner surface of the entire acceleration chamber 51) of 20-80%.

In the present embodiment, a is 15 μm±3 μm, b is 15 μm±3 μm, c is 4 μm±0.5 μm, h is 10 μm±1 μm, and η is 40%; and a square having the side length of L is taken from the inner surface of the acceleration chamber 51 as an analysis unit having the area of $L^2$.

It should be noted that the active design of a roughness factor of the inner surface of the acceleration chamber of the nozzle can be realized by setting parameters of the micro-bulges.

The formation of the turbulent flow in traditional electrostatic nozzles is not conducive to the uniform spreading of the MQL liquid. The MQL liquid and the compressed air become extremely unstable under the mixing action of spiral airflow, and have uneven velocity distribution and relatively high turbulence intensity. The phenomena become particularly apparent after acceleration in the acceleration chamber, which eventually causes uneven size distribution of the droplets sprayed from the nozzle. Relatively large fluctuation of the formed liquid line is also not conducive to the controllable transportation after forming droplets. The micro-texture electrostatic nozzle according to the present embodiment is characterized in that a series of micro-bulges are arranged on the inner side surface of the acceleration chamber to greatly improve the oleophilic performance of the inner surface of the acceleration chamber; the inner surface of the acceleration chamber can effectively adsorb MQL liquid flowing out of the mixing chamber due to the oleophilic performance, thereby improving the movement resistance of the MQL liquid, forming the uniform oil film under the pulling effect of the compressed air, greatly reducing the disturbance of jet and improving the uniformity of the liquid lines of the liquid film, so that the finally formed droplets are distributed more uniformly and the movement paths of the droplets are more controllable. A series of micro-bulges arranged on the inner side surface of the acceleration chamber also greatly increase the contact area between the nozzle core and the MQL liquid, and also greatly increase the contact time between the MQL liquid and the micro-bulges due to better oleophilic performance, thereby having more ideal charging performance.

Embodiment 2

As shown in FIGS. 2-4, a two-stage composite micro-texture electrostatic nozzle according to the present embodiment comprises:

an upper nozzle body 42, a lower nozzle body 43, an insulation sealing ring 44, a nozzle core 45, an annular check ring 46, an MQL liquid conveying pipe interface 47, an air storage chamber 48, spiral air holes 49, a gas-liquid mixing chamber 50, an acceleration chamber 51, a nozzle outlet 52, a high-voltage wire interface 53, a high-voltage wire outlet through hole 54, a check ring placement groove 55, a $V_2O_5$ nanofiber sheet 56 and micro-bulges 57.

The upper nozzle body 42 is connected above the nozzle core through threads; the lower nozzle body 43 is connected below the nozzle core 45 through threads; and the insulation sealing ring 44 is arranged between the upper nozzle body 42 and the lower nozzle body 43 and can effectively prevent gas in the nozzle from leaking. The upper nozzle body 42 and the lower nozzle body 43 are made of insulation materials; and the nozzle core 45 is made of a metal conductive material. The MQL liquid conveying pipe interface 47 is arranged above the upper nozzle body 42 and can be connected with an insulation coil pipe 37 through threads; therefore, compressed air flowing through the insulation coil pipe 37 can enter the electrostatic nozzle. The air storage chamber 48 is arranged in the nozzle core 45, plays the roles of storing the compressed air and reducing pressure, and plays the same role as a free space formed between the upper nozzle body 42 and the nozzle core 45. The gas-liquid mixing chamber 50, the acceleration chamber 51 and the nozzle outlet 52 are sequentially arranged inside the nozzle core 45 from top to bottom. A contraction angle α of the acceleration chamber 51 is between 5° and 20°; the nozzle outlet has a diameter of B and a length of L; a value of L/B is between 2 and 6; and α is 13°, B is 1 mm, and L/B is 4 in the present embodiment.

The check ring placement groove 55 is arranged above the nozzle core 45; and the annular check ring 46 is fixedly bonded in a groove of the check ring placement groove 55. The annular check ring 46 is an insulation annular rubber ring with elasticity; 4-10 $V_2O_5$ nanofiber sheets 56 are distributed on the annular check ring 46 in a form of arrays; and 8 sheets are taken for example in FIG. 3. The $V_2O_5$ nanofiber sheets 56 are pasted around the annular check ring 46 by one circle to cover an annular central hole; the insulation oil pipe 38 penetrates through centers of a plurality of $V_2O_5$ nanofiber sheets 56 and enters the gas-liquid mixing chamber 50; the $V_2O_5$ nanofiber sheets 56 have special properties, can perform strong reversible contraction similar to muscle under the action of an external electric field, and can tightly wrap the insulation oil pipe 38 to avoid the backflow of airflow and lubrication liquid caused by the airflow in the gas-liquid mixing chamber 50. The annular check ring 46 has certain elasticity, and has the amount of elastic deformation capable of counteracting the amount of contraction of the $V_2O_5$ nanofiber sheets 56. The spiral air holes 49 are formed in the nozzle core 45 and are distributed along an outer wall of the gas-liquid mixing chamber 50 in the form of arrays. An inlet axis is tangent to a wall surface of an inner cavity of the gas-liquid mixing chamber 50. The compressed air flows through the spiral air holes 49 and enters the gas-liquid mixing chamber 50 at a tangential velocity v. The compressed air enters the gas-liquid mixing chamber 50 through a plurality of spiral air holes 49 at the same time, and a speed direction of the compressed air does not intersect with an axial center. As a result, the incoming airflow has a moment of momentum to the axial center, which prompts the airflow to rotate about the axial center in the gas-liquid mixing chamber 50 and simultaneously propels the airflow toward the direction of the nozzle outlet, thereby driving the nanofluid to rotate to form vortex. The vortex is formed so that the MQL liquid is fully mixed with the compressed air and turbulent flow is also formed at the same time. The acceleration chamber 51 and the nozzle outlet 52 are mainly used for acceleration of jet and spreading of the lubrication liquid in the nozzle. The lubrication liquid is usually pulled into a liquid film or a liquid line in the nozzle and at the outlet, and finally is broken up into droplets under the action of external forces such as aerodynamic force and electrostatic force. The high-voltage wire interface 53 is arranged on the nozzle core 45; the high-voltage wire outlet through hole 54 is formed in the lower nozzle body 43; and a DC high-voltage wire 8 can penetrate through the high-voltage wire outlet through hole 54 to be connected with the high-voltage wire interface 53 so as to supply power to the nozzle core 45. A series of micro-bulges 57 are arranged on the inner wall of the acceleration chamber 51. Specific shapes and positions of the micro-bulges 57 are as shown in FIGS. 7(a) and 7(b).

Figure 7A:
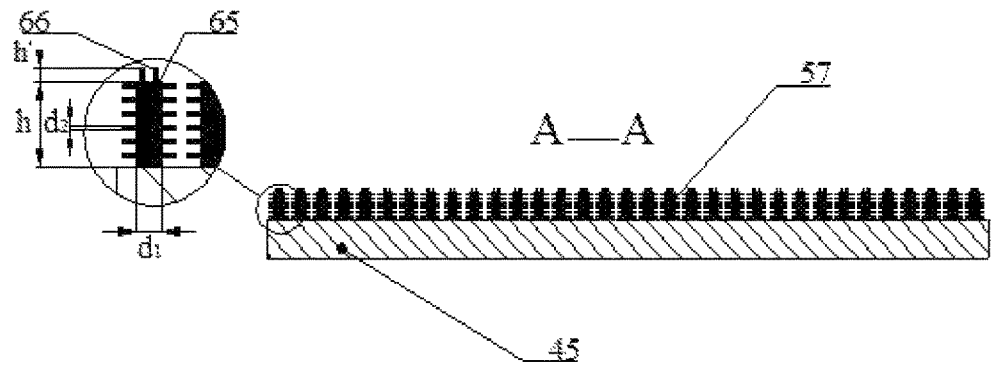
FIG. 7(a) is a schematic diagram of distribution of a micro-texture unfolded on an inner surface of an acceleration chamber of a two-stage composite micro-texture electrostatic nozzle provided by an embodiment of the present disclosure.
Figure 7B:
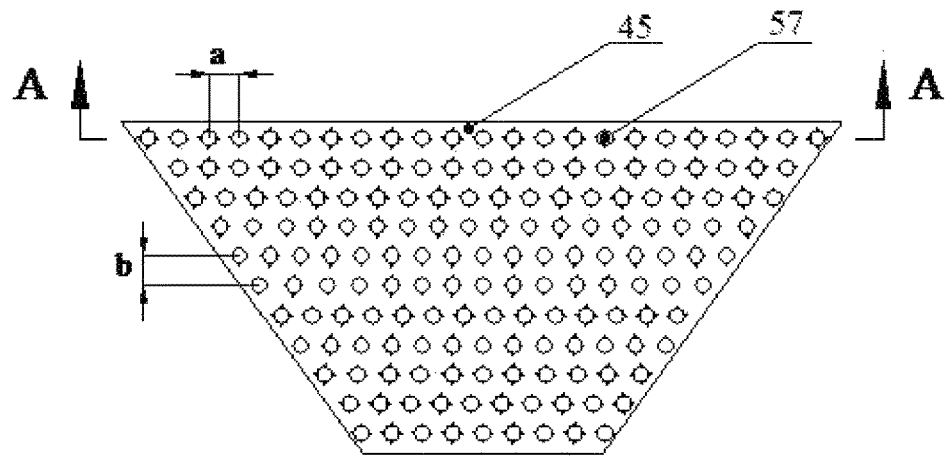
FIG. 7(b) is a schematic diagram of distribution of a micro-texture unfolded on an inner surface of an acceleration chamber of a two-stage composite micro-texture electrostatic nozzle provided by an embodiment of the present disclosure.

As shown in FIGS. 7(a) and 7(b), the micro-bulges 57 in the present embodiment are composed of first-stage micro-bulges 65 and second-stage micro-bulges 66, which are uniformly distributed on the inner wall of the acceleration chamber 51; and the second-stage micro-bulges 66 are arranged on the first-stage micro-bulges 65. In the present embodiment, the first-stage micro-bulges 65 and the second-stage micro-bulges 66 are both cylindrical, and have diameters of $d_1$ and $d_2$, respectively, wherein $d_2$ is ⅕-⅔ of $d_1$. The micro-bulges can also be set as cones and polygonal prisms. Various first-stage micro-bulges 65 have a horizontal center distance a of 5-50 μm, a vertical center distance b of 5-50 μm, a height h of 3-30 μm, and an area occupation ratio η (i.e., a ratio of a projected area of all the first-stage micro-bulges 65 to an area of the inner surface of the entire acceleration chamber 51) of 20-80%; and the number $n_1$ of the first-stage micro-bulges 65 can be obtained according to the area occupation ratio η. A height h' of the second-stage micro-bulges 66 is ⅕-⅓ of h; an area occupation ratio of the second-stage micro-bulges 66 (i.e., the ratio of the projected area of all the second-stage micro-bulges 66 to the area of surfaces the first-stage micro-bulges 65) is 30-80%; and the number $n_2$ of the second-stage micro-bulges 66 on each first-stage micro-bulge 65 can be obtained according to the area occupation ratio η'.

In the present embodiment, $d_1$ is 4 μm±0.5 μm, $d_2$ is 1.5 μm±0.5 μm, a is 15 μm±m μm, b is 15 μm±m μm, h is 10 μm±1 μm, η is 40%, h' is 3 μm±0.5 μm, and η' is 50%.

The two-stage composite micro-texture electrostatic nozzle according to the present embodiment is characterized in that a series of micro-convex bodies are arranged on the inner side surface of the acceleration chamber; the micro-bulges are two-stage composite structures composed of primary micro-bulges and secondary micro-bulges; and compared with the individual micro-bulge structure, the composite micro-bulges will undoubtedly improve the oleophilic performance of the inner surface of the acceleration chamber more greatly; the inner surface of the acceleration chamber can effectively adsorb MQL liquid flowing out of the mixing chamber due to the oleophilic performance, thereby improving the movement resistance of the MQL liquid, forming the uniform oil film under the pulling effect of the compressed air, greatly reducing the disturbance of jet and improving the uniformity of the liquid lines of the liquid film, so that the finally formed droplets are distributed more uniformly and the movement paths of the droplets are more controllable. A series of two-stage composite micro-bulges arranged on the inner side surface of the acceleration chamber also greatly increase the contact area between the nozzle core and the MQL liquid, and also greatly increase the contact time between the MQL liquid and the micro-bulges due to better oleophilic performance, thereby having more ideal charging performance.

Embodiment 3

As shown in FIGS. 2-4, a noise-reducing and resistance-increasing electrostatic nozzle according to the present embodiment specifically comprises an upper nozzle body 42, a lower nozzle body 43, an insulation sealing ring 44, a nozzle core 45, an annular check ring 46, an MQL liquid conveying pipe interface 47, an air storage chamber 48, spiral air holes 49, a gas-liquid mixing chamber 50, an acceleration chamber 51, a nozzle outlet 52, a high-voltage wire interface 53, a high-voltage wire outlet through hole 54, a check ring placement groove 55, a $V_2O_5$ nanofiber sheet 56 and micro-bulges 57.

The upper nozzle body 42 is connected above the nozzle core through threads; the lower nozzle body 43 is connected below the nozzle core 45 through threads; and the insulation sealing ring 44 is arranged between the upper nozzle body 42 and the lower nozzle body 43 and can effectively prevent gas in the nozzle from leaking. The upper nozzle body 42 and the lower nozzle body 43 are made of insulation materials; and the nozzle core 45 is made of a metal conductive material. The MQL liquid conveying pipe interface 47 is arranged above the upper nozzle body 42 and can be connected with an insulation coil pipe 37 through threads; therefore, compressed air flowing through the insulation coil pipe 37 can enter the electrostatic nozzle. The air storage chamber 48 is arranged in the nozzle core 45, plays the roles of storing the compressed air and reducing pressure, and plays the same role as a free space formed between the upper nozzle body 42 and the nozzle core 45. The gas-liquid mixing chamber 50, the acceleration chamber 51 and the nozzle outlet 52 are sequentially arranged inside the nozzle core 45 from top to bottom. A contraction angle α of the acceleration chamber 51 is between 5° and 20°; the nozzle outlet has a diameter of B and a length of L; a value of L/B is between 2 and 6; and α is 13°, B is 1 mm, and L/B is 4 in the present embodiment. The check ring placement groove 55 is arranged above the nozzle core 45; and the annular check ring 46 is fixedly bonded in a groove of the check ring placement groove 55. The annular check ring 46 is an insulation annular rubber ring with elasticity; 4-10 $V_2O_5$ nanofiber sheets 56 are distributed on the annular check ring 46 in a form of arrays; and 8 sheets are taken for example in FIG. 3. The $V_2O_5$ nanofiber sheets 56 are pasted around the annular check ring 46 by one circle to cover an annular central hole; the insulation oil pipe 38 penetrates through centers of a plurality of $V_2O_5$ nanofiber sheets 56 and enters the gas-liquid mixing chamber 50; the $V_2O_5$ nanofiber sheets 56 have special properties, can perform strong reversible contraction similar to muscle under the action of an external electric field, and can tightly wrap the insulation oil pipe 38 to avoid the backflow of airflow and lubrication liquid caused by the airflow in the gas-liquid mixing chamber 50. The annular check ring 46 has certain elasticity, and has the amount of elastic deformation capable of counteracting the amount of contraction of the $V_2O_5$ nanofiber sheets 56. The spiral air holes 49 are formed in the nozzle core 45 and are distributed along an outer wall of the gas-liquid mixing chamber 50 in the form of arrays. An inlet axis is tangent to a wall surface of an inner cavity of the gas-liquid mixing chamber 50. The compressed air flows through the spiral air holes 49 and enters the gas-liquid mixing chamber 50 at a tangential velocity v. The compressed air enters the gas-liquid mixing chamber 50 through a plurality of spiral air holes 49 at the same time, and a speed direction of the compressed air does not intersect with an axial center. As a result, the incoming airflow has a moment of momentum to the axial center, which prompts the airflow to rotate about the axial center in the gas-liquid mixing chamber 50 and simultaneously propels the airflow toward the direction of the nozzle outlet, thereby driving the nanofluid to rotate to form vortex. The vortex is formed so that the MQL liquid is fully mixed with the compressed air and turbulent flow is also formed at the same time. The acceleration chamber 51 and the nozzle outlet 52 are mainly used for acceleration of jet and spreading of the lubrication liquid in the nozzle. The lubrication liquid is usually pulled into a liquid film or a liquid line in the nozzle and at the outlet, and finally is broken up into droplets under the action of external forces such as aerodynamic force and electrostatic force. The high-voltage wire interface 53 is arranged on the nozzle core 45; the high-voltage wire outlet through hole 54 is formed in the lower nozzle body 43; and a DC high-voltage wire 8 can penetrate through the high-voltage wire outlet through hole 54 to be connected with the high-voltage wire interface 53 so as to supply power to the nozzle core 45. A series of micro-bulges 57 are arranged on the inner wall of the acceleration chamber 51. Specific shapes and positions of the micro-bulges 57 are as shown in FIGS. 8(a) and 8(b).

Figure 8A:
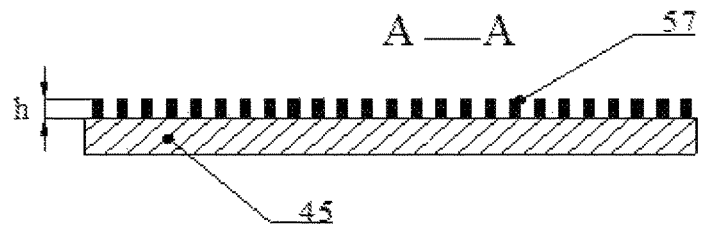
FIG. 8(a) is a schematic diagram of distribution of a micro-texture unfolded on an inner surface of an acceleration chamber of a noise-reducing and resistance-increasing electrostatic nozzle provided by an embodiment of the present disclosure.
Figure 8B:
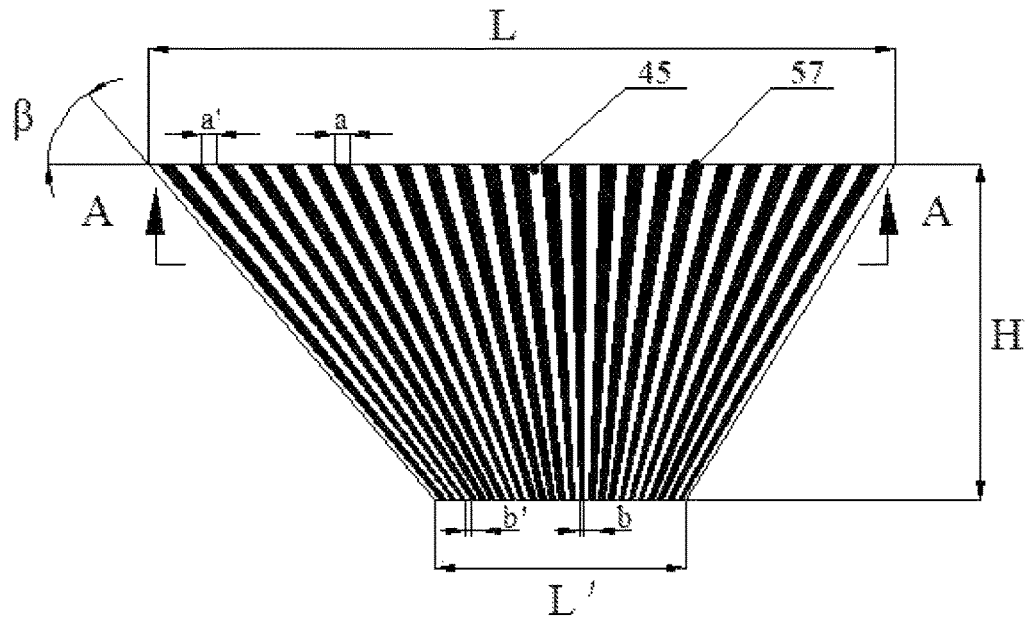
FIG. 8(b) is a schematic diagram of distribution of a micro-texture unfolded on an inner surface of an acceleration chamber of a noise-reducing and resistance-increasing electrostatic nozzle provided by an embodiment of the present disclosure.
Figures 9A, 9B:
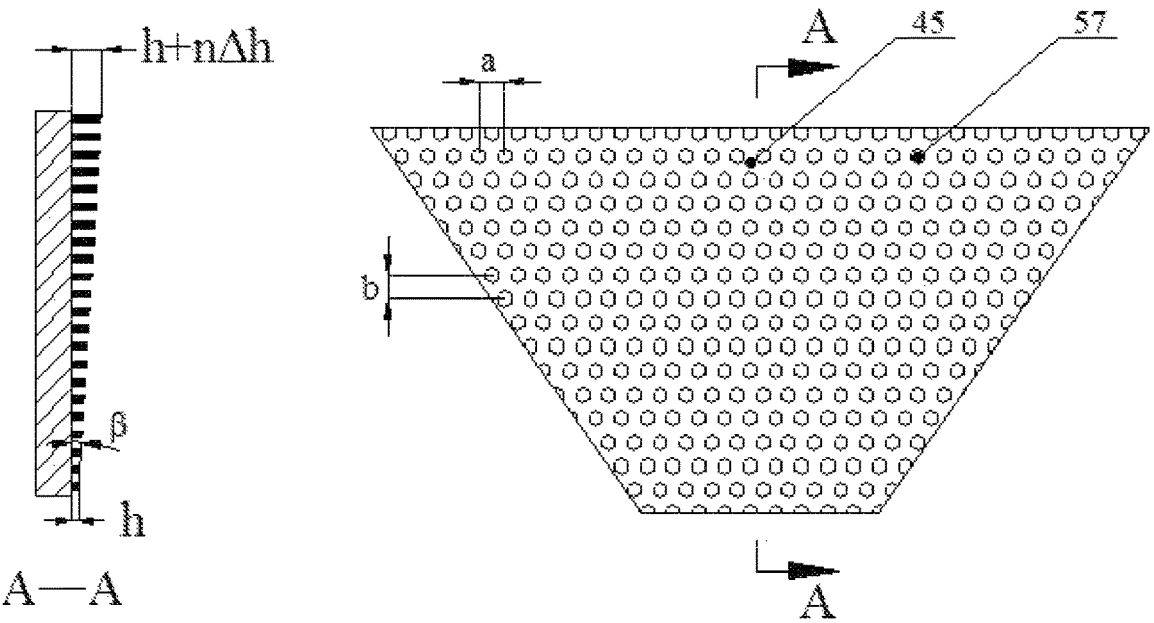
FIG. 9(a) is a schematic diagram of distribution of a micro-texture unfolded on an inner surface of an acceleration chamber of a gradient micro-bulge contact type electrostatic nozzle provided by an embodiment of the present disclosure.
FIG. 9(b) is a schematic diagram of distribution of a micro-texture unfolded on an inner surface of an acceleration chamber of a gradient micro-bulge contact type electrostatic nozzle provided by an embodiment of the present disclosure.
Figure 10:
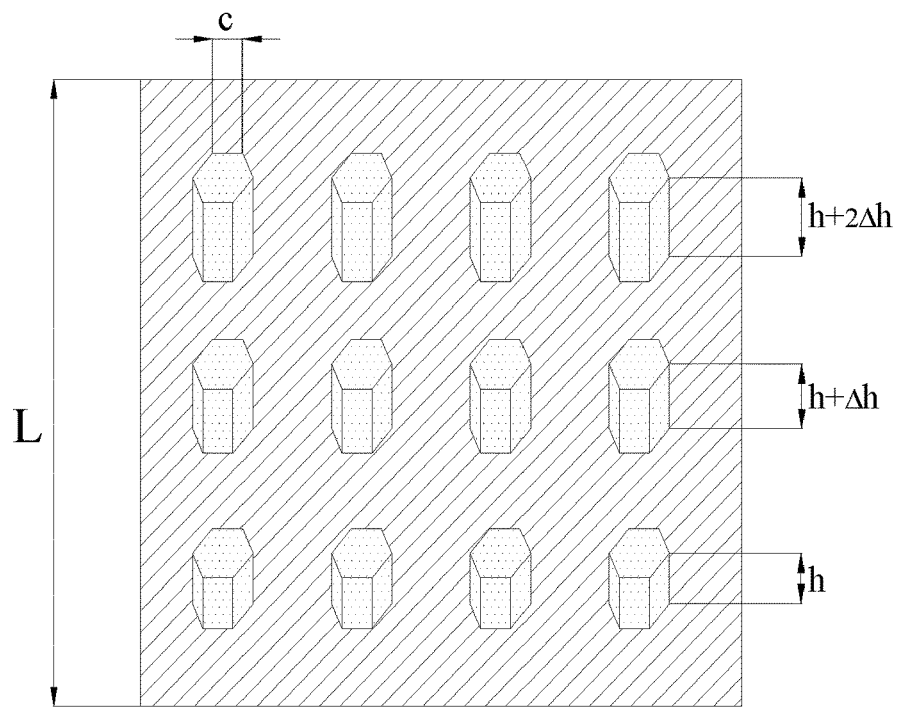
FIG. 10 is a structural schematic diagram of a unit area of a micro-texture unfolded on an inner surface of an acceleration chamber of a gradient micro-bulge contact type electrostatic nozzle provided by an embodiment of the present disclosure.

As shown in FIGS. 8(a) and 8(b), the micro-bulges 57 are uniformly distributed on the inner wall of the acceleration chamber 51. After the acceleration chamber 51 is unfolded, an upper side length is L, a lower side length is L', a height is H, and an angle between an upper side and an unfolded side is β. In the present embodiment, the micro-bulges are of a conical strip shape (a conical strip-shaped groove is formed between any two conical strip-shaped micro-bulges 57). A width a of an upper part of each conical strip-shaped micro-bulge 57 is 3-30 μm; a distance between the upper parts of the two conical strip-shaped micro-bulges 57 is a'; and a=a'. A width of a lower part of each conical strip-shaped micro-bulge 57 is b; the distance between the lower parts of the two conical strip-shaped micro-bulges 57 is b'; and b=b'. In the present embodiment, a/a'=L/L'; the height of the conical strip-shaped micro-bulges 57 is h; and an area occupation ratio η (i.e., a ratio of a projected area of all the micro-bulges 57 to an area of the inner surface of the entire acceleration chamber 51) is 20-80%. In the present embodiment, a is 15 μm±m μm, h is 10 μm±m and η is 50%.

The noise-reducing and resistance-increasing electrostatic nozzle according to the present embodiment is characterized in that a series of conical strip-shaped micro-bulges are arranged on the inner side surface of the acceleration chamber to greatly improve the oleophilic performance of the inner surface of the acceleration chamber; the inner surface of the acceleration chamber can effectively adsorb MQL liquid flowing out of the mixing chamber due to the oleophilic performance, thereby improving the movement resistance of the MQL liquid, forming the uniform oil film under the pulling effect of the compressed air, greatly reducing the disturbance of jet and improving the uniformity of the liquid lines of the liquid film, so that the finally formed droplets are distributed more uniformly and the movement paths of the droplets are more controllable. Meanwhile, the conical strip-shaped grooves formed between the conical strip-shaped micro-bulges can effectively reduce noise, thereby reducing harm to the hearing health of the operators. A series of micro-bulges arranged on the inner side surface of the acceleration chamber also greatly increase the contact area between the nozzle core and the MQL liquid, and also greatly increase the contact time between the MQL liquid and the micro-bulges due to better oleophilic performance, thereby having more ideal charging performance.

Embodiment 4

As shown in FIGS. 2-4, a gradient micro-bulge contact type electrostatic nozzle according to the present embodiment comprises an upper nozzle body 42, a lower nozzle body 43, an insulation sealing ring 44, a nozzle core 45, an annular check ring 46, an MQL liquid conveying pipe interface 47, an air storage chamber 48, spiral air holes 49, a gas-liquid mixing chamber 50, an acceleration chamber 51, a nozzle outlet 52, a high-voltage wire interface 53, a high-voltage wire outlet through hole 54, a check ring placement groove 55, a $V_2O_5$ nanofiber sheet 56 and micro-bulges 57.

The upper nozzle body 42 is connected above the nozzle core through threads; the lower nozzle body 43 is connected below the nozzle core 45 through threads; and the insulation sealing ring 44 is arranged between the upper nozzle body 42 and the lower nozzle body 43 and can effectively prevent gas in the nozzle from leaking. The upper nozzle body 42 and the lower nozzle body 43 are made of insulation materials; and the nozzle core 45 is made of a metal conductive material. The MQL liquid conveying pipe interface 47 is arranged above the upper nozzle body 42 and can be connected with an insulation coil pipe 37 through threads; therefore, compressed air flowing through the insulation coil pipe 37 can enter the electrostatic nozzle. The air storage chamber 48 is arranged in the nozzle core 45, plays the roles of storing the compressed air and reducing pressure, and plays the same role as a free space formed between the upper nozzle body 42 and the nozzle core 45. The gas-liquid mixing chamber 50, the acceleration chamber 51 and the nozzle outlet 52 are sequentially arranged inside the nozzle core 45 from top to bottom. A contraction angle α of the acceleration chamber 51 is between 5° and 20°; the nozzle outlet has a diameter of B and a length of L; a value of L/B is between 2 and 6; and α is 13°, B is 1 mm, and L/B is 4 in the present embodiment. The check ring placement groove 55 is arranged above the nozzle core 45; and the annular check ring 46 is fixedly bonded in a groove of the check ring placement groove 55. The annular check ring 46 is an insulation annular rubber ring with elasticity; 4-10 $V_2O_5$ nanofiber sheets 56 are distributed on the annular check ring 46 in a form of arrays; and 8 sheets are taken for example in FIG. 3. The $V_2O_5$ nanofiber sheets 56 are pasted around the annular check ring 46 by one circle to cover an annular central hole; the insulation oil pipe 38 penetrates through centers of a plurality of $V_2O_5$ nanofiber sheets 56 and enters the gas-liquid mixing chamber 50; the $V_2O_5$ nanofiber sheets 56 have special properties, can perform strong reversible contraction similar to muscle under the action of an external electric field, and can tightly wrap the insulation oil pipe 38 to avoid the backflow of airflow and lubrication liquid caused by the airflow in the gas-liquid mixing chamber 50. The annular check ring 46 has certain elasticity, and has the amount of elastic deformation capable of counteracting the amount of contraction of the $V_2O_5$ nanofiber sheets 56. The spiral air holes 49 are formed in the nozzle core 45 and are distributed along an outer wall of the gas-liquid mixing chamber 50 in the form of arrays. An inlet axis is tangent to a wall surface of an inner cavity of the gas-liquid mixing chamber 50. The compressed air flows through the spiral air holes 49 and enters the gas-liquid mixing chamber 50 at a tangential velocity v. The compressed air enters the gas-liquid mixing chamber 50 through a plurality of spiral air holes 49 at the same time, and a speed direction of the compressed air does not intersect with an axial center. As a result, the incoming airflow has a moment of momentum to the axial center, which prompts the airflow to rotate about the axial center in the gas-liquid mixing chamber 50 and simultaneously propels the airflow toward the direction of the nozzle outlet, thereby driving the nanofluid to rotate to form vortex. The vortex is formed so that the MQL liquid is fully mixed with the compressed air and turbulent flow is also formed at the same time. The acceleration chamber 51 and the nozzle outlet 52 are mainly used for acceleration of jet and spreading of the lubrication liquid in the nozzle. The lubrication liquid is usually pulled into a liquid film or a liquid line in the nozzle and at the outlet, and finally is broken up into droplets under the action of external forces such as aerodynamic force and electrostatic force. The high-voltage wire interface 53 is arranged on the nozzle core 45; the high-voltage wire outlet through hole 54 is formed in the lower nozzle body 43; and a DC high-voltage wire 8 can penetrate through the high-voltage wire outlet through hole 54 to be connected with the high-voltage wire interface 53 so as to supply power to the nozzle core 45. A series of micro-bulges 57 are arranged on the inner wall of the acceleration chamber 51. Specific shapes and positions of the micro-bulges 57 are as shown in FIGS. 9(*a*) and 9(*b*).

As shown in FIGS. 9(A), 9(*b*) and 10, the micro-bulges 57 are uniformly distributed on the inner wall of the acceleration chamber 51. The micro-bulges are hexagonal prisms in the present embodiment; and similarly, the micro-bulges 57 may be cylinders, cones or polygonal prisms. The micro-bulges 57 have a transitional non-contour structure, i.e., the heights of the micro-bulges gradually decrease along a movement direction of the jet, and a height difference between two adjacent rows is $\Delta h$. Various micro-bulges 57 have a horizontal center distance a of 5-50 μm, a vertical center distance b of 5-50 μm, a height h of 2-15 μm of the shortest micro-bulge, the height difference $\Delta h$ of 0.3-2 μm and an area occupation ratio $\eta$ (i.e., a ratio of a projected area of all the micro-bulges 57 to an area of the inner surface of the entire acceleration chamber 51) of 20-80%. An angle formed by upper surfaces of the micro-bulges 57 and the inner surface of the acceleration chamber 51 is $\beta$. In the present embodiment, a is 15 μm±3 μm, b is 15 μm±3 μm, h is 4 μm±0.3 μm, $\Delta h$ is 0.5 μm±0.1 μm, and $\eta$ is 40%. A square having the side length of L is taken from the inner surface of the acceleration chamber 51 as an analysis unit, which has the area of $L^2$ and comprises the shortest micro-bulge.

The gradient micro-bulge contact type electrostatic nozzle according to the present embodiment is characterized in that a series of transitional non-contour micro-bulges are arranged on an inner side surface of an acceleration chamber; the adoption of the transitional micro-bulges enables movement resistance of the MQL liquid in the acceleration chamber to be distributed from large to small, which is conducive to forming a uniform oil film under a pulling effect of the compressed air and also greatly reducing disturbance of jet and improves uniformity of liquid lines of a liquid film, so that the finally formed droplets are distributed more uniformly and movement paths of the droplets are more controllable. A series of micro-bulges arranged on the inner side surface of the acceleration chamber also greatly increase the contact area between the nozzle core and the MQL liquid, and also greatly increase the contact time between the MQL liquid and the micro-bulges due to better oleophilic performance, thereby having more ideal charging performance.

Embodiment 5

A controllable jet MQL grinding system according to the present embodiment comprises the micro-texture electrostatic nozzle as shown in FIGS. 2-6.

Figure 11:
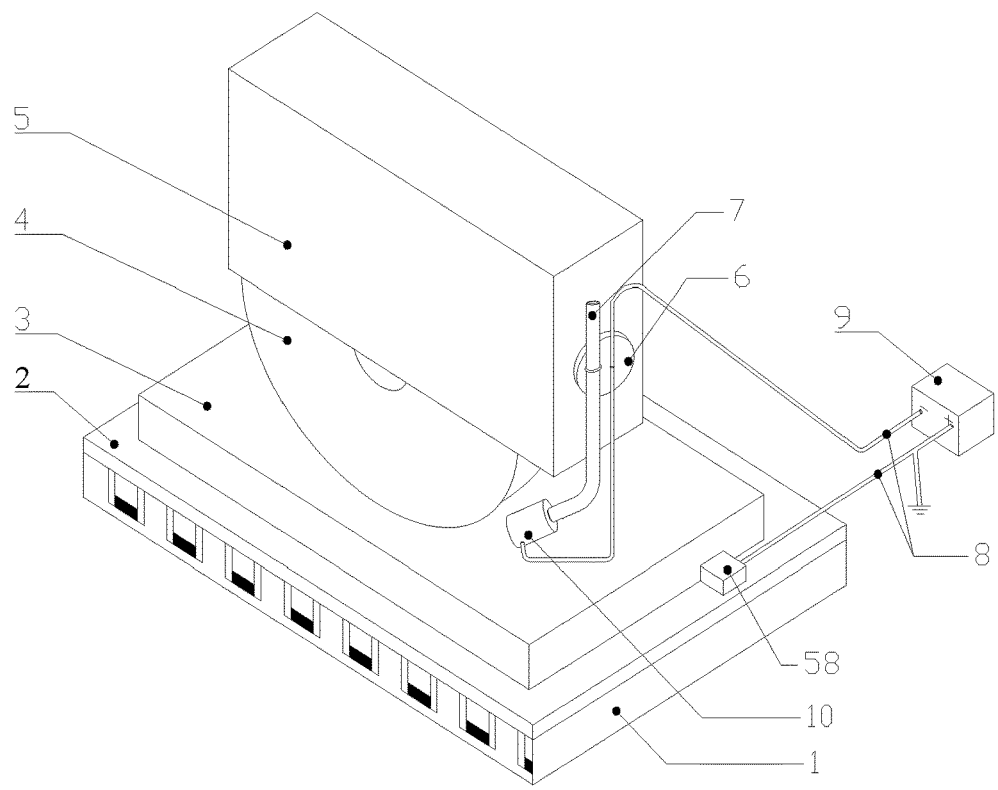
FIG. 11 is an axonometric schematic diagram of a controllable jet MQL grinding system provided by an embodiment of the present disclosure.

As shown in FIG. 11, controllable jet MQL grinding system according to the present embodiment comprises a grinding machine part workbench 1, an insulation plate, a workpiece 3, a grinding wheel 4, a grinding wheel cover 5, a magnetic chuck 6, an MQL liquid conveying pipe 7, DC high-voltage wires 8, an adjustable high-voltage DC power supply 9, an electrostatic nozzle 10, a workpiece power-up device 58 and an MQL device.

The grinding machine part workbench 30 is covered with the insulation plate 2 (which is magnetic conductive, but not electric conductive, thereby not only ensuring mounting of the workpiece, but also ensuring formation of a stable electric field between the nozzle and the workpiece). The magnetic chuck 6 is adsorbed on a side surface of the grinding wheel cover 5. The MQL liquid conveying pipe 7 and one of the DC high-voltage wires 8 connected with the nozzle are fixed by an insulation plastic link buckle. One end of the MQL liquid conveying pipe 7 is connected with the MQL device, and the other end is connected with the electrostatic nozzle. One end of one of the DC high-voltage wires 8 is connected with the electrostatic nozzle to supply power to the nozzle, and the other end is connected with a negative output end of the adjustable high-voltage DC power supply 9. One end of the other DC high-voltage wire 8 is connected with the workpiece power-up device 58, and the other end is connected with a positive output end of the adjustable high-voltage DC power supply 9 and is grounded. The workpiece power-up device 58 is adsorbed on a non-machined surface of the workpiece 3; and the workpiece is connected with a positive electrode of the adjustable high-voltage DC power supply 9 so that the nozzle is of negative polarity, the surface of the workpiece is of positive polarity, and the electric field is formed between the nozzle and the workpiece, thereby providing conditions for controllable transportation of MQL droplets.

Figure 12:
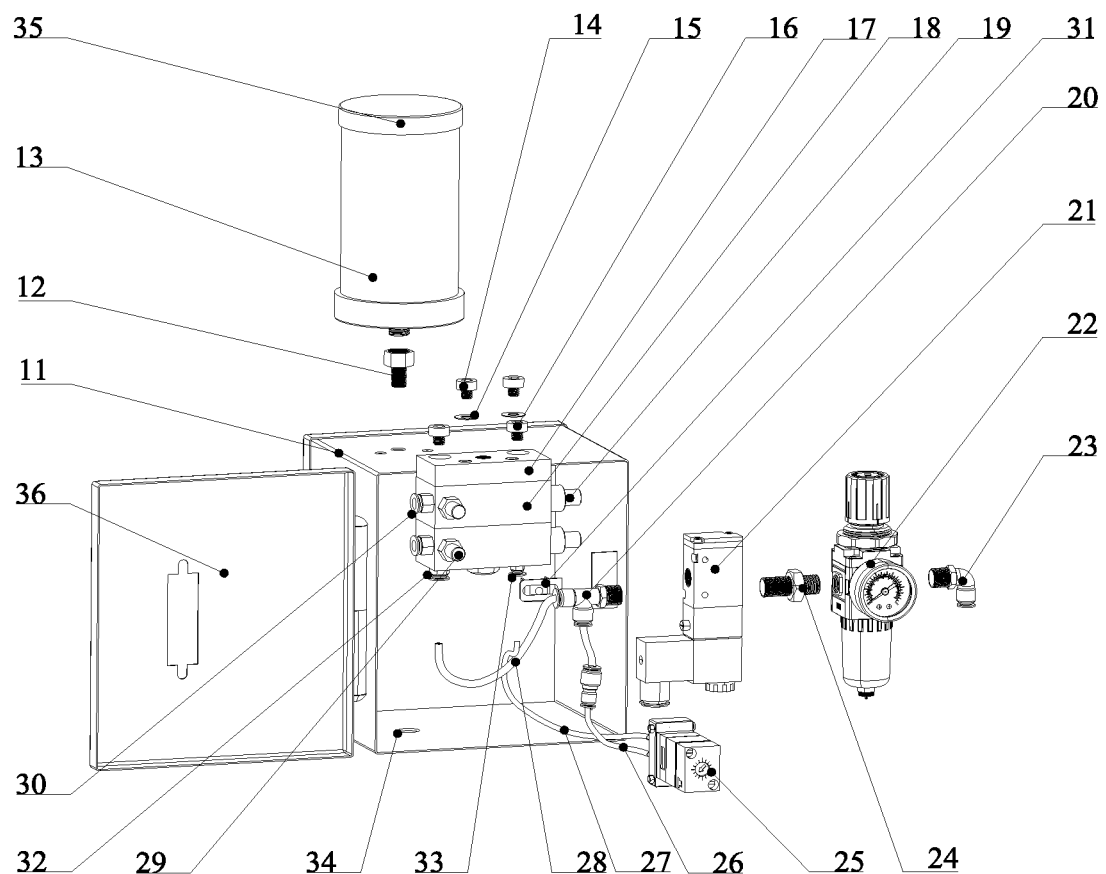
FIG. 12 is an exploded schematic diagram of a controllable jet MQL grinding system provided by an embodiment of the present disclosure.

As shown in FIG. 12, the MQL device specifically comprises a box body 11, an insulation oil cup connector 12, an insulation oil cup 13, an insulation fixing bolt 14, insulation washers 15, insulation connecting bolts 16, a micro-pump fixing plate 17, precise MQL pumps 18, an air flow adjustment knob 19, an insulation tee 20, an electromagnetic valve 21, a filter pressure-adjusting valve 22, an air source connector 23, a bidirectional connector 24, a pulse controller 25, an air pipe I 26, an air pipe II 27, an air pipe III 28, a liquid flow adjustment knob 29, a gas-liquid outlet connector 30, an electromagnetic valve mounting frame 31, a lubrication pump air inlet interface I 32, a lubrication pump air inlet interface II 33, an MQL liquid conveying pipe outlet hole 34, an oil cup cover 35 and a box cover 36.

The box body 11 is made of insulation plastics; and the box cover 36 made of insulation plastics is arranged in front of the box body 11. Two groups of precise MQL pumps 18 are arranged in the box body 11 and are arranged up and down in parallel; the precise MQL pumps 18 are fixedly connected below the micro-pump fixing plate 17 by insulation connecting bolts 16; liquid inlet holes are reserved below the micro-pump fixing plate 17; and the positions of the liquid inlet holes correspond to liquid inlet holes of the precise MQL pumps 18. Further, the micro-pump fixing plate 17 is fixedly connected to the top of an inner side of the box body 11 by the insulation fixing bolts 14 and the insulation washers 15. The insulation oil cup connector 12 penetrates through the upper part of the box body 11 and is fixed on each liquid inlet hole arranged above the micro-pump fixing plate 17 through thread connection; the upper part of the insulation oil cup connector 12 is connected with the insulation oil cup 13 so as to supply liquid to the precise MQL pumps 18; and the oil cup cover 35 is arranged above the insulation oil cup 13.

One end of the air source connector 23 is fixed on the filter pressure-adjusting valve 22, and the other end is connected with a compressed air source. The filter pressure-adjusting valve 22 is arranged on an outer side of the box body 11; the compressed air enters the filter pressure-adjusting valve 22 through the air source connector 23; and the filter pressure-adjusting valve 22 is used for filtering the compressed air and adjusting the inlet air pressure, thereby providing clean compressed air with stable pressure for a lubrication system. The filter pressure-adjusting valve 22 is connected with the electromagnetic valve 21 through the bidirectional connector 24 to control on-off of the compressed air; the electromagnetic valve 21 is fixedly mounted on the electromagnetic valve mounting frame 31; and the electromagnetic valve mounting frame 31 is arranged in the box body 11. An outlet of the electromagnetic valve 21 is connected with a right interface of the insulation tee 20; the compressed air passes through a lower interface of the insulation tee 20 and is introduced into the pulse controller 25 through the air pipe I 26; the compressed air further enters the lubrication pump air inlet interface II 33 arranged below each precise MQL pump 18 through the air pipe II 27; and the path of compressed air is used for the precise MQL pump 18 to suck the MQL liquid in the insulation oil cup 13, and can be called a liquid suction air path; therefore, an air outlet frequency can be controlled by the pulse controller 25, thereby controlling the frequency of the precise MQL pump 18 to suck the MQL liquid. A left interface of the insulation tee 20 is connected with the lubrication pump air inlet interface I 32 arranged below the precise MQL pump 18 through the air pipe III 28; and the path of compressed air is used for conveying atomized MQL liquid and can be called an atomized air path. The air flow adjustment knob 19 and the liquid flow adjustment knob 29 are arranged on each precise MQL pump 18; the air flow adjustment knob 19 is used for adjusting the flow of the compressed air in the atomized air path; and the liquid flow adjustment knob 29 is used for adjusting the liquid suction amount in each pulse of the precise MQL pump 18. The MQL conveying pipe 7 penetrates through the MQL liquid conveying pipe outlet hole 34 and is connected with the gas-liquid outlet connector 30 arranged on the precise MQL pump 18 for outputting the atomized air and the MQL liquid.

Figure 13:
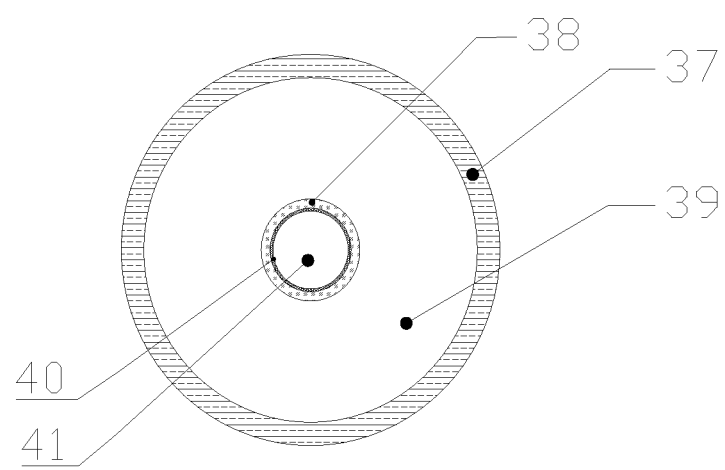
FIG. 13 is a cross-sectional view of an MQL liquid conveying pipe provided by an embodiment of the present disclosure.

As shown in FIG. 13, the MQL conveying pipe 7 is specifically composed of an insulation coil pipe 37, an insulation oil pipe 38, a gas conveying cavity 39, a hydrophobic and oleophobic carbon nano-coating 40 and a liquid conveying cavity 41.

The insulation coil pipe 37 is arranged on an outermost side of the MQL conveying pipe 7; the insulation oil pipe 38 is arranged inside the MQL conveying pipe 7; and the gas conveying cavity 39 is formed between the insulation coil pipe 37 and the insulation oil pipe 38 for conveying the atomized air. The hydrophobic and oleophobic carbon nano-coating 40 is coated inside the insulation oil pipe 38; and meanwhile, the liquid conveying cavity is formed inside the insulation oil pipe 38. One end of the insulation coil pipe 37 is connected with the gas-liquid outlet connector 30, and the other end is connected with the electrostatic nozzle, so that the atomized air enters the electrostatic nozzle through the precise MQL pump 18. One end of the insulation oil pipe 38 penetrates through the gas-liquid outlet connector 30 and is connected with an MQL liquid outlet arranged inside the precise MQL pump 18, and the other end is connected with the electrostatic nozzle, so that the MQL liquid enters the electrostatic nozzle through the precise MQL pump 18. Thus, the atomized air and the MQL liquid are supplied to the nozzle in a coaxial manner in the present embodiment.

Figure 14:
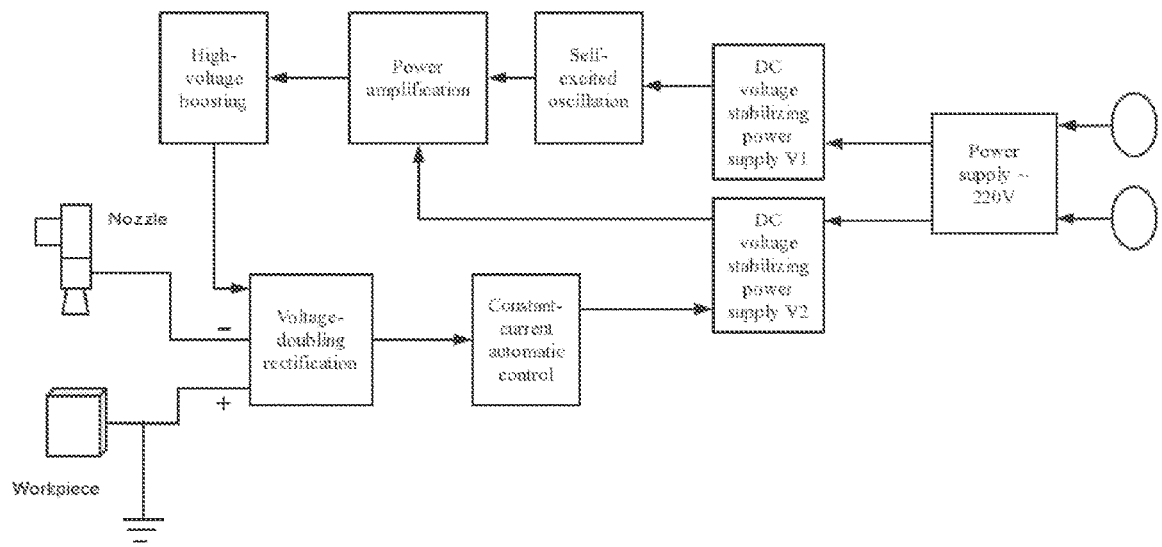
FIG. 14 is a block diagram of an adjustable high-voltage direct-current (DC) power supply circuit provided by an embodiment of the present disclosure.

As shown in FIG. 14, the adjustable high-voltage DC power supply is composed of an alternating current (AC) power supply unit, a DC voltage stabilizing unit V1, a DC voltage stabilizing unit V2, a self-excited oscillation circuit, a power amplification circuit, a high-frequency pulse booster, a voltage-doubling rectification circuit and a constant-current automatic control circuit.

In the present embodiment, the high-voltage DC power supply can generate relatively high electrostatic high voltage, but the power supply current is small so that the safety performance is relatively high. The box body, the insulation coil pipe, the insulation oil pipe, the insulation fixing bolts, the insulation washers, the insulation connecting bolts, the micro-pump fixing plate, the insulation oil cup connector and the insulation oil cup adopted in the present embodiment are all made of insulation materials to effectively prevent the system from electric leakage.

Figure 15A:
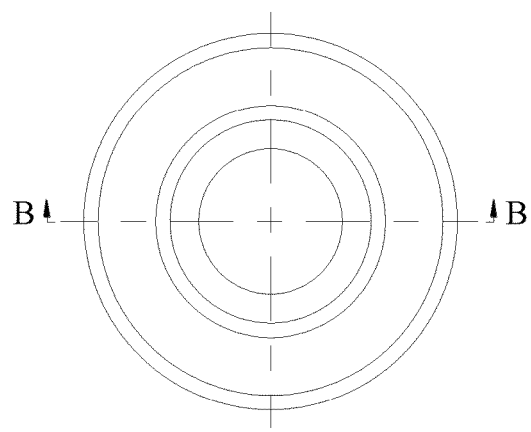
FIG. 15(a) is a sectional view of a workpiece power-up device provided by an embodiment of the present disclosure.
Figure 15B:
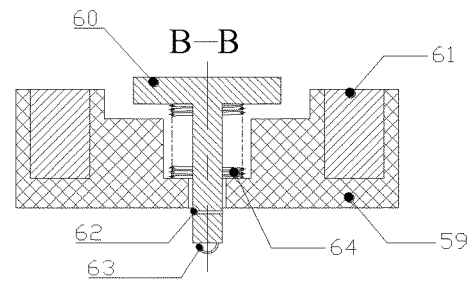
FIG. 15(b) is a top view of a workpiece power-up device provided by an embodiment of the present disclosure.

As shown in FIGS. 15(a) and 15(b), the workpiece power-up device 58 is composed of an insulation housing 59, an iron weight 60, a permanent magnet 61, a cotter pin slot 62, a wiring ring 63 and a compression spring 64.

The permanent magnet 61 is arranged in the insulation housing 59; the iron weight 60 is arranged at a center of the insulation housing 59; and the lower part of the iron weight 60 penetrates through the insulation housing 59. The cotter pin slot 62 and the wiring ring 63 are arranged at a tail part of the iron weight 60; and the compression spring 64 is arranged between the iron weight 60 and the insulation housing 59. When the workpiece power-up device 58 is close to the non-machined surface of the workpiece, the permanent magnet 61 may generate an attraction force with the workpiece 3 to compress the compression spring 64; and meanwhile, the compression spring 64 provides a reaction force to ensure that the iron weight 60 is closely connected with the workpiece 3. The cotter pin slot 62 is formed in the iron weight 60, and plays a role of allowing insertion of a cotter pin to ensure that the iron weight 60 and the compression spring 64 will not fall off from the insulation housing 59 when the workpiece power-up device 58 is not adsorbed to the workpiece 3. The wiring ring 63 is connected with a positive terminal of the adjustable high-voltage DC power supply 9 by the DC high-voltage wire 8.

Specific working processes of the controllable jet MQL grinding system according to the present embodiment are as follows:

The insulation plate 2 is laid on the grinding machine part workbench 1; the workpiece 3 is placed on the insulation plate 2; and a magnetic switch of the workbench is turned on to clamp the workpiece. In terms of the electrostatic nozzle, the upper nozzle body 42, the lower nozzle body 43, the insulation sealing ring 44, the nozzle core 45 and the annular check ring 46 are connected in the above-mentioned connection manner. The oil cup cover 35 above the insulation oil cup 13 is opened, and the lubrication liquid (which is usually the nanofluid formed by mixing pure vegetable-based oil with nanoparticles) is injected into the insulation oil cup 13. Both ends of the MQL liquid conveying pipe 7 are respectively connected with the electrostatic nozzle and the MQL device; the insulation coil pipe 37 at one end connected with the electrostatic nozzle is connected with the MQL liquid conveying pipe interface 47; and the insulation oil pipe 38 penetrates through the centers of a plurality of $V_2O_5$ nanofiber sheets 56 and enters a gas-liquid mixing chamber 50. The insulation coil pipe 37 at one end connected with the MQL device is connected with the gas-liquid outlet connector 30 arranged on the precise MQL pump 18; and one end of the insulation oil pipe 38 penetrates through the gas-liquid outlet connector 30 and is connected with an MQL liquid outlet arranged inside the precise MQL pump 18. The insulation oil pipe 38 can convey the lubrication liquid in the MQL pump to the gas-liquid mixing chamber 50 by the liquid conveying cavity 41. The insulation coil pipe 37 can convey the atomized compressed air to the nozzle body through the gas conveying cavity 39. One end of one DC high-voltage wire 8 penetrates through the high-voltage wire outlet through hole 54 and is connected with the high-voltage wire interface 53; and the other end is connected with the negative terminal of the adjustable high-voltage DC power supply 9. The MQL liquid conveying pipe 7 and the DC high-voltage wire 8 are fixed on the grinding wheel cover 5 by the magnetic chuck 6 to prevent movement. Another DC high-voltage wire 8 is taken; one end of the DC high-voltage wire 8 is connected with the wiring ring 63; and the other end is connected with a positive terminal of the adjustable high-voltage DC power supply 9. The workpiece power-up device 58 is adsorbed on the non-machined surface of the workpiece 3, so that an electric field is formed between the electrostatic nozzle and the workpiece 3, thereby providing conditions for controllable transportation of MQL oil mist. The box body 11, the insulation coil pipe 37, the insulation oil pipe 38, the insulation fixing bolts 14, the insulation washers 15, the insulation connecting bolts 16, the micro-pump fixing plate 17, the insulation oil cup connector 12 and the insulation oil cup 13 in the solution are all made of insulation materials to effectively prevent the system from electric leakage.

An external air source is connected with the air source connector 23 to supply the compressed air to the MQL device; and the filter pressure-adjusting valve 22 is opened and adjusted to a required pressure. The compressed air enters the electromagnetic valve 21 through the filter pressure-adjusting valve 22 and the bidirectional connector 24; and the electromagnetic valve 21 can control the on-off of the compressed air. The compressed air enters the insulation tee 20 through the outlet of the electromagnetic valve 21; the insulation tee 20 divides the compressed air into two paths, one of which enters the pulse controller 25 through the air pipe I 26; and the air outlet frequency can be controlled by the pulse controller 25. The compressed air enters the lubrication pump inlet interface II 33 arranged below the precise MQL pump 18 through the air pipe II 27 after the frequency is adjusted by the pulse controller 25; and the path of compressed air is used for the precise MQL pump 18 to suck the MQL liquid in the insulation oil cup 13, and can be called the liquid suction air path. The frequency of the compressed air entering the precise MQL pump 18 is controlled by the pulse controller 25, thereby controlling the frequency of the precise MQL pump 18 to suck the MQL liquid; the discharge amount of the lubrication liquid per pulse can be adjusted by the liquid flow adjustment knob 29 after the MQL liquid is sucked into the precise MQL pump 18; and the MQL liquid is discharged and then is conveyed to the gas-liquid mixing chamber 50 through the liquid conveying cavity 41. The other path of compressed air is connected with the lubrication pump air inlet interface I 32 arranged below the precise MQL pump 18 through the air pipe III 28; the output air volume of the path of compressed air can be adjusted by the flow adjustment knob 19; and the adjusted compressed air is conveyed to the nozzle body through the gas conveying cavity 39 for conveying the atomized MQL liquid. A hydrophobic oleophobic carbon nano-coating 40 is coated inside an insulation oil pipe 38; and adsorbed gas molecules can stably exist on a nanoscale concave surface, so that a macro-surface equivalently has a stable gas film, oil and water cannot directly contact with surfaces of materials, and the surfaces of the materials present extraordinary amphiphobic (oleophobic and hydrophobic) properties, thereby effectively avoiding a problem of blockage of the oil pipe.

The MQL liquid enters the gas-liquid mixing chamber 50 through the liquid conveying cavity 41; and the compressed air enters the air storage chamber 48 through the gas conveying cavity 39 and further enters the gas-liquid mixing chamber 50 through the spiral air holes 49. Since the spiral air holes 49 are distributed along an outer wall of the gas-liquid mixing chamber 50 in the form of arrays, an inlet axis is tangent to a wall surface of an inner cavity of the gas-liquid mixing chamber 50; and the compressed air flows through the spiral air holes 49 and enters the gas-liquid mixing chamber 50 at a tangential velocity v. The compressed air enters the gas-liquid mixing chamber 50 through a plurality of spiral air holes 49 at the same time, and a speed direction of the compressed air does not intersect with an axial center. As a result, the incoming airflow has a moment of momentum to the axial center, which prompts the airflow to rotate about the axial center in the gas-liquid mixing chamber 50 and simultaneously propels the airflow toward the direction of the nozzle outlet, thereby driving the nano-fluid to rotate to form vortex. The vortex is formed so that the MQL liquid is fully mixed with the compressed air and turbulent flow is also formed at the same time. The MQL liquid is fully mixed with the compressed air and then passes through two parts comprising the acceleration chamber 51 and the nozzle outlet 52; in this process, the mixed flow is accelerated and spread; and the lubrication liquid is usually pulled into a liquid film or a liquid line in the nozzle and at the outlet, and finally is broken up into droplets under the action of external forces such as aerodynamic force and electrostatic force. The formation of the turbulent flow in traditional electrostatic nozzles is not conducive to the uniform spreading of the MQL liquid. The MQL liquid and the compressed air become extremely unstable under the mixing action of spiral airflow, and have uneven velocity distribution and relatively high turbulence intensity. The phenomena become particularly apparent after acceleration in the acceleration chamber 51, which eventually causes uneven size distribution of the droplets sprayed from the nozzle. Relatively large fluctuation of the formed liquid line is also not conducive to the controllable transportation after forming droplets. In order to solve the problem, a series of micro-bulges 57 are arranged on the inner surface of the acceleration chamber, have shapes and distributions as described above, and are prepared into a charge nozzle containing a micro-texture in the solution.

Beneficial effects of the micro-texture charge nozzle can be analyzed by a Yong's equation and a Wenzel model. A contact angle of liquid on a solid surface is determined by mutual balance of surface tensions among solid, air and liquid interfaces; and a final balance state enables a total energy of the system to tend to be minimum, so that the liquid is generally in a steady state or metastable state on the solid surface. Generally, the contact angle of the droplets on a smooth and flat solid surface can be expressed by the Yong's equation:

$$\gamma_{sv}=\gamma_{sl}+\gamma_{lv}\cos\theta \quad (1);$$

namely, $$\cos\theta = \frac{\gamma_{sv}-\gamma_{sl}}{\gamma_{lv}}, \quad (2)$$

wherein $\gamma_{sv}$, $\gamma_{sl}$ and $\gamma_{lv}$ respectively refer to the surface tensions of a solid-gas interface, a solid-liquid interface and a gas-liquid interface; and θ refers to a balance contact angle, which can also be called an intrinsic contact angle.

The Wenzel model shows that a real contact angle of a droplet placed on a rough surface is hard to measure, and what is measured in an experiment is only an apparent contact angle, which can be expressed by $\theta_r$. If pits on the rough solid surface can be filled with the liquid on the solid surface, it is called wet contact. A change of free energy of the system caused by the change of the interface under conditions of constant temperature and constant pressure at this time can be expressed as follows:

$$d_E=r(\gamma_{sv}-\gamma_{sl})dx+\gamma_{lv}dx\cos\theta_r \quad (3);$$

in the equation, $d_E$ refers to the total energy required when a contact line has an infinitely small amount dx of movement; and $d_E=0$ in the balance state; thus a relationship between the apparent contact angle and the intrinsic contact angle can be obtained as follows:

$$\cos\theta_r=r(\gamma_{sv}-\gamma_{sl})/\gamma_{lv} \quad (4);$$

in the equation, r refers to the roughness factor, which means a ratio of an actual solid-liquid interface contact area to an apparent contact area (r≥1). The equation (2) can be compared with the equation (4) to obtain that:

$$\cos\theta_r=r\cos\theta \quad (5).$$

The Wenzel model shows that the existence of a rough surface makes the actual solid-liquid contact area greater than the apparent contact area, thereby geometrically enhancing the lyophobicity or lyophilicity. When θ<90°, $\theta_r$ decreases with the increase of the surface roughness, and the surface becomes more lyophilic. When θ>90°, $\theta_r$ increases with the increase of the surface roughness, and the surface becomes more lyophobic. The nozzle core 45 adopted in the solution is made of a metal conductive material, which is usually red copper or stainless steel; and the surfaces of the materials are oleophilic surfaces, i.e., θ<90°. The inner surface of the traditional nozzle is relatively smooth and the value of r is relatively small. In the solution, a series of micro-bulges 57 are arranged on the inner side surface of the acceleration chamber 51, which will undoubtedly greatly increase the r value and make r much greater than 1, i.e., greatly increase the oleophilic performance of the inner surface of the acceleration chamber 51. Hexagonal prism micro-bulges used in the solution are uniformly distributed on the surface having a unit area of $L^2$; the hexagonal prism micro-bulges have a side length of c, a height of h, and a distribution number of n able to be determined according to η and the actual area of the inner surface of the acceleration chamber; and the roughness factor r per unit area at this moment can be calculated as follows:

$$r = \frac{L^2 + n \cdot 6ch}{L^2}. \tag{6}$$

It can be seen from the equation (6) that the active design of roughness factor r can be realized by setting the number n, side length c and height h of the micro-bulges.

The inner surface of the acceleration chamber 51 can effectively adsorb MQL liquid flowing out of the mixing chamber 50 due to the oleophilic performance, thereby improving the movement resistance of the MQL liquid, forming the uniform oil film under the pulling effect of the compressed air, greatly reducing the disturbance of jet and improving the uniformity of the liquid lines of the liquid film, so that the finally formed droplets are distributed more uniformly and the movement paths of the droplets are more controllable. A series of micro-bulges 57 arranged on the inner side surface of the acceleration chamber 51 also greatly increase the contact area between the nozzle core 45 and the MQL liquid, and also greatly increase the contact time between the MQL liquid and the micro-bulges due to better oleophilic performance, thereby having more ideal charging performance.

A switch of the adjustable high-voltage DC pow supply 9 is turned on to supply pow to the nozzle core 45; the nozzle core 45 charges the MQL liquid through contact with the MQL liquid; and the MQL liquid is atomized into uniform small droplets under the action of electrostatic force and aerodynamic force, and then is controllably conveyed to the cutting region to realize functions of cooling and lubrication. A specific atomization mechanism of the MQL liquid can be expressed as follows.

Electrostatic atomization is a phenomenon that the electrostatic force overcomes the surface tension of liquid to break up the liquid into tiny mist droplets. The nozzle core 45 is in contact with the MQL liquid so that the surface of the liquid carries a lot of homo-charges, thereby improving activity of the surface of the liquid, making the surface molecules subject to significant directional arrangement and reducing the surface tension. The surface tension will gradually decrease with the increase of the charge quantity under a condition of constant liquid volume. When the surface tension is not large enough to bind the liquid, the liquid will be broken up into fine mist droplets under mutual repulsion between the homo-charges on the surface and disturbance of liquid surface caused by the external forces.

When a high relative velocity exists between the droplets and the surrounding air, the splitting of the droplets is controlled by the aerodynamic pressure, the surface tension and the viscous force. For the liquid with relatively low viscosity, the breakup of the droplets is mainly determined by the aerodynamic pressure and the surface tension. The aerodynamic pressure on the liquid film, the liquid line and large droplets is $0.5\rho_g \Delta V^2$, wherein $\rho_g$ refers to the air density and $\Delta V$ refers to a gas-liquid relative velocity. However, a cohesive force generated by the surface tension will prevent the liquid from deformation and breakup; the cohesive force can be expressed as $4\sigma/D$; $\sigma$ refers to the inherent surface tension of the liquid; and D refers to an initial droplet diameter.

When the droplet diameter decreases, the cohesive force is increased; when the cohesive force and a tensile stress caused by the aerodynamic pressure are balanced, the droplets remain stable; and if the two cannot offset each other, the droplets will be deformed or even broken up. A non-dimensional number can be obtained according to a principle of balancing the tensile stress generated by the aerodynamic force acting on the droplets and the cohesive force generated by the surface tension:

$$We = \frac{\rho_g \Delta V^2 D}{\sigma} = 8. \tag{7}$$

Thus, when the weber number is greater than 8, the force applied to the droplets is unbalanced and the deformation occurs. In addition, a maximum steady-state droplet diameter corresponding to $\Delta V$ can be obtained according to (7):

$$D_{max} = \frac{8\sigma}{\Delta V^2 \rho_g}. \tag{8}$$

The surface tension of charged droplets becomes weak under the action of Coulomb repulsion, and a tension value of the weakened surface is:

$$\sigma' = \sigma - \frac{q^2}{64\pi^2 \varepsilon r^3}, \tag{9}$$

wherein r refers to a radius of the droplets, q refers to the charge quantity of the droplets, and ε refers to a dielectric constant of the surrounding air. It is apparent from the equation that the surface tension decreases when the charge q increases so that the surface charge of the droplets is conducive to atomization.

At this moment, We of the charged droplets can be expressed as:

$$We = \frac{\rho_g \Delta V^2 D}{\sigma - \frac{q^2}{64\pi^2 \varepsilon r^3}} = \frac{128\pi^2 \varepsilon R^4 \rho_g \Delta V^2}{64\pi^2 \varepsilon R^3 \sigma - q^2}. \tag{10}$$

It can be seen from (10) that the breakup of the charged droplets in high-speed airflow is closely related to the gas-liquid relative velocity, gas-liquid physical parameters and a charging field. In addition, if the droplets reach a stable state in the airflow, after the droplets are charged with static electricity, the We number is increased; the surface tension of the liquid is decreased and is not enough to resist the aerodynamic pressure; and the droplets will be further deformed and broken up. Therefore, the particle size of the mist droplets after being charged with static electricity is smaller under the condition of same gas-liquid parameters. Thus, a purpose of refining mist droplet particles is achieved; and meanwhile, same charges on the surfaces of the droplets can ensure more uniform distribution of the droplets.

The charge quantity of the contact charge is calculated by an equation as follows:

$$q_t = \frac{12\pi\varepsilon_0 \varepsilon r_1^2 E_0}{E_0 + 2\varepsilon} \times \frac{t}{t+\tau} - \frac{q_{max}t}{t+\tau}, \quad (11)$$

wherein $q_t$ refers to the charge quantity of the large droplets before splitting; $\varepsilon_0$ and $\varepsilon$ respectively refer to the dielectric constants of air and MQL oil; $r_1^2$ refers to the radius of the large droplets before splitting; $E_0$ refers to the spatial electric field strength; $q_{max}$ refers to the saturated charge quantity of the droplets; $\tau$ refers to a charged time constant; and t refers to charged time. It can be seen from the equation 11 that an effective method for increasing the charge quantity is to improve the electric field strength or increase the charged time; and the micro-bulges 57 are arranged to effectively increase the charged time t. A Sauter mean diameter (SMD) $d_{32}$ of the MQL liquid after charged atomization can be calculated by the following equation:

$$d_{32} = \frac{k_1}{|u_l - u_g|} \left(\frac{\sigma}{\rho_l}\right)^{0.5} + \frac{k_2}{\rho_l^{1.12}} \left(\frac{\mu_l}{\sigma^{0.5}}\right)^{0.45} \left(\frac{Q_g}{Q_l}\right)^{1.5} |u_l - u_g|, \quad (12)$$

wherein $k_1$ refers to a coefficient related to the nozzle structure; $k_2$ refers to a coefficient related to the charge quantity $q_t$; $|u_l - u_g|$ refers to an absolute value of the relative velocity of liquid and gas; $\mu_l$ refers to a dynamic viscosity coefficient of liquid; $\sigma$ refers to the surface tension of liquid; $\rho_l$ refers to the density of liquid; $Q_l$ refers to the liquid flow; and $Q_g$ refers to the gas flow. It can be seen from the equation (12) that the particle size of the droplets formed by charged atomization is directly related to the nozzle structure, liquid parameters and gas parameters.

The droplets sprayed out from the nozzle accelerate to move the workpiece under the action of the aerodynamic force and the electric field force, directionally move under the action of the electric field force and cover the surface of the workpiece to the maximum extent. An "electrostatic encirclement" effect exists in the electrostatic field, so the droplets and the nanoparticles can more easily enter depressions of the surface of the workpiece with a certain roughness when moving to the workpiece, thereby expanding a relative coverage area and playing better roles of lubrication and heat transfer.

It can be seen from FIG. 14 that the adjustable high-voltage DC power supply 37 is composed of a self-excited oscillation circuit, a power amplification circuit, a high-frequency pulse booster, a voltage-doubling rectification circuit, a DC voltage stabilizing unit V1, a DC voltage stabilizing unit V2 and a constant-current automatic control circuit. The working principle is that an input end is connected with an AC power supply; and the DC voltage stabilizing unit V1 and the DC voltage stabilizing unit V2 provide DC voltage. The DC voltage stabilizing unit V1 serves as a working voltage of the self-excited oscillation circuit. The DC voltage stabilizing unit V2 is a main energy source for power conversion; the high-frequency pulse booster is rectified by the voltage-doubling rectification circuit to obtain high-voltage static electricity; a base pulse signal is obtained by the self-excited oscillation circuit, and is boosted by the high-frequency pulse booster after being amplified by the power amplification circuit; and finally, a high-voltage signal is outputted and passes through the voltage-doubling rectification circuit to output a DC high voltage.

The power supply is characterized by generating relatively high electrostatic high voltage and having small power supply current, which is generally not greater than 500 μA. The constant-current automatic control circuit automatically samples the electrostatic working current of the voltage-doubling rectification circuit, so that the working current will not rise under constant current when a working load is normally increased. When an external load exceeds an allowable current, the self-excited oscillation circuit stops oscillation to cut off the high voltage. This characteristic is reliable to the safety of operators due to once approaching or touching a high-voltage end, a weak shock current is caused and the high-voltage output is cut off at the same time to avoid danger of life.

Embodiment 6

A controllable jet MQL grinding system in the present embodiment differs from the controllable jet MQL grinding system in the embodiment 5 in that: the electrostatic nozzles are different in structures.

The controllable jet MQL grinding system according to the present embodiment comprises the two-stage composite micro-texture electrostatic nozzle as shown in FIGS. 2, 3, 4, 7(a) and 7(b).

Specific working processes of the controllable jet MQL grinding system in the present embodiment are the same as those in the embodiment 5, except that:

The inner surface of the traditional nozzle is relatively smooth and the value of r is relatively small; in the solution, a series of micro-bulges 57 are arranged on the inner side surface of the acceleration chamber 51; the micro-bulges 57 are of a two-stage composite structure and are composed of first-stage micro-bulges 65 and second-stage micro-bulges 66; compared with an individual micro-bulge structure, the composite micro-bulges will undoubtedly increase of the value of r and make r much greater than 1, thereby greatly improving oleophilic performance of the inner surface of the acceleration chamber 51. The first-stage micro-bulges 65 and the second-stage micro-bulges 66 used in the solution respectively have diameters of $d_1$ and $d_2$, heights of h and h', the number $n_1$ of the first-stage micro-bulges 65 and the number $n_2$ of the second-stage micro-bulges 66; and if a total area of the inner surface of the acceleration chamber 51 is S, the roughness factor r can be calculated as follows:

$$r = \frac{S + n_1 \pi d_1 h + n_1 n_2 \pi d_2 h'}{S}. \quad (13)$$

It can be seen from the equation (13) that the active design of the roughness factor r can be realized by setting the number $n_1$, the diameter $d_1$ and the height h of the first-stage micro-bulges 65, as well as the number $n_2$, the diameter $d_2$ and the height h' of the second-stage micro-bulges 66.

Embodiment 7

A controllable jet MQL grinding system in the present embodiment differs from the controllable jet MQL grinding system in the embodiment 5 in that: the electrostatic nozzles are different in structures.

The controllable jet MQL grinding system according to the present embodiment comprises the noise-reducing and resistance-increasing electrostatic nozzle as shown in FIGS. 2, 3, 4, 8(a) and 8(b).

Specific working processes of the controllable jet MQL grinding system in the present embodiment are the same as those in the embodiment 5, except that:

The Wenzel model shows that the existence of a rough surface makes the actual solid-liquid contact area greater than the apparent contact area, thereby geometrically enhancing the lyophobicity or lyophilicity. When θ<90°, $θ_r$ decreases with the increase of the surface roughness, and the surface becomes more lyophilic. When θ>90°, $θ_r$ increases with the increase of the surface roughness, and the surface becomes more lyophobic. The nozzle core 45 adopted in the solution is made of a metal conductive material, which is usually red copper or stainless steel; and the surfaces of the materials are oleophilic surfaces, i.e., θ<90°. The inner surface of the traditional nozzle is relatively smooth and the value of r is relatively small. In the solution, a series of micro-bulges 57 are arranged on the inner side surface of the acceleration chamber 51, which will undoubtedly greatly increase the r value and make r much greater than 1, i.e., greatly increase the oleophilic performance of the inner surface of the acceleration chamber 51. Conical strip-shaped micro-bulges 57 used in the present embodiment are uniformly distributed on the inner surface of the acceleration chamber, have an upper side length of a, a lower side length of b and a height of h, and can be determined according to η and the area of the inner surface of the acceleration chamber; and at this moment, the roughness factor r per unit area can be calculated as follows:

$$r = \frac{\frac{L}{a}\left(\frac{L-L'}{2\cos\beta} + H\right) \cdot h + (L+L') \cdot H}{(L+L') \cdot H} \tag{14}$$

It can be seen from the equation (14) that the active design of the roughness factor r can be realized by setting the number n, the upper side length a and the height h of the micro-bulges 57.

The inner surface of the acceleration chamber 51 can effectively adsorb MQL liquid flowing out of the mixing chamber 50 due to the oleophilic performance, thereby improving the movement resistance of the MQL liquid, forming the uniform oil film under the pulling effect of the compressed air, greatly reducing the disturbance of jet and improving the uniformity of the liquid lines of the liquid film, so that the finally formed droplets are distributed more uniformly and the movement paths of the droplets are more controllable. A series of micro-bulges 57 arranged on the inner side surface of the acceleration chamber 51 also greatly increase the contact area between the nozzle core 45 and the MQL liquid, and also greatly increase the contact time between the MQL liquid and the micro-bulges due to better oleophilic performance, thereby having more ideal charging performance. Meanwhile, the conical strip-shaped grooves formed between the conical strip-shaped micro-bulges can effectively reduce noise, thereby reducing harm to the hearing health of the operators.

Embodiment 8

A controllable jet MQL grinding system in the present embodiment differs from the controllable jet MQL grinding system in the embodiment 5 in that: the electrostatic nozzles are different in structures.

The controllable jet MQL grinding system according to the present embodiment comprises the gradient micro-bulge contact type electrostatic nozzle as shown in FIGS. 2, 3, 4, 9(*a*), 9(*b*) and 10.

Specific working processes of the controllable jet MQL grinding system in the present embodiment are the same as those in the embodiment 5, except that:

The Wenzel model shows that the existence of a rough surface makes the actual solid-liquid contact area greater than the apparent contact area, thereby geometrically enhancing the lyophobicity or lyophilicity. When θ<90°, $θ_r$ decreases with the increase of the surface roughness, and the surface becomes more lyophilic. When θ>90°, $θ_r$ increases with the increase of the surface roughness, and the surface becomes more lyophobic. The nozzle core 45 adopted in the solution is made of a metal conductive material, which is usually red copper or stainless steel; and the surfaces of the materials are oleophilic surfaces, i.e., θ<90°. The inner surface of the traditional nozzle is relatively smooth and the value of r is relatively small. In the solution, a series of transitional micro-bulges 57 are arranged on the inner side surface of the acceleration chamber 51, which will undoubtedly greatly increase the r value and make r much greater than 1, i.e., greatly increase the oleophilic performance of the inner surface of the acceleration chamber 51. Hexagonal prism micro-bulges used in the solution are uniformly distributed on the surface having a unit area of $L^2$; the hexagonal prism micro-bulges have a side length of c, a minimum height of h, a height difference of Δh, an area occupation ratio of η and a vertical center distance of b; an angle formed by an upper surface of each micro-bulge 57 and the inner surface of the acceleration chamber 51 is β; and the roughness factor r per unit area at this moment can be calculated as follows:

$$r = \frac{\frac{2L^2\eta}{3\sqrt{3}c^2}\left[6c\left(2h + \frac{\Delta hL}{b}\right) + \frac{3\sqrt{3}c^2}{2}\left(\frac{1}{\cos\beta} - 1\right)\right]}{L^2}. \tag{15}$$

It can be seen from the equation (15) that the active design of roughness factor r can be realized by setting the area occupation ratio η, the side length c, the height h, the height difference Δh and the vertical center distance b of the micro-bulges.

The inner surface of the acceleration chamber 51 can effectively adsorb MQL liquid flowing out of the mixing chamber 50 due to the oleophilic performance, thereby improving the movement resistance of the MQL liquid. The adoption of the transitional micro-bulges enables movement resistance of the MQL liquid in the acceleration chamber 51 to be distributed from large to small, which is conducive to forming a uniform oil film under a pulling effect of the compressed air and also greatly reducing disturbance of jet and improves uniformity of liquid lines of a liquid film, so that the finally formed droplets are distributed more uniformly and movement paths of the droplets are more controllable. A series of transitional micro-bulges 57 arranged on the inner side surface of the acceleration chamber 51 also greatly increase the contact area between the nozzle core 45 and the MQL liquid, and also greatly increase the contact time between the MQL liquid and the micro-bulges due to better oleophilic performance, thereby having more ideal charging performance.

The specific embodiments of the present disclosure are described above with reference to the accompanying drawings, but are not used to limit the protection scope of the present disclosure. Those skilled in the art shall understand that various modifications or variations that can be made by those skilled in the art without contributing creative labor on the basis of the technical solutions of the present disclosure still fall within the protection scope of the present disclosure.

We claim:

1. A micro-texture electrostatic nozzle, comprising a nozzle core, wherein an upper nozzle body is connected above the nozzle core; a free space is formed between the upper nozzle body and the nozzle core for storing compressed air and reducing pressure; a lower nozzle body is connected below the nozzle core; a gas-liquid mixing chamber, an acceleration chamber and a nozzle outlet are sequentially arranged inside the nozzle core from top to bottom in a predetermined direction; and a plurality of micro-bulges are uniformly distributed on an inner wall of the acceleration chamber, wherein each of the micro-bulges comprises,
a body that is mounted to the inner wall of the acceleration chamber and extends in an axial direction from the inner wall of the acceleration chamber, wherein the body of each of the micro-bulges has a cross-sectional area,
at least one projection mounted to and extending from the body, wherein the at least one projection has a cross-sectional area, and
wherein a ratio of a sum of the cross-sectional areas of each body of the micro-bulges that are uniformly distributed on the inner wall of the acceleration chamber and a surface area of the inner wall of the acceleration chamber is 40%;
wherein a ratio of a sum of the cross-sectional areas of all projections mounted to and extending from each body of the micro-bulges and the sum of the cross-sectional areas of each body of the micro-bulges is 50%;
wherein a contraction angle α of an acceleration chamber is between 5-20°, a diameter of the nozzle outlet is B, a length of the nozzle outlet is L, and a value of L/B is from 2 to 6.

2. The micro-texture electrostatic nozzle according to claim 1, wherein the body of each of the micro-bulges comprises a cylinder having a circumferential surface and an end surface distant from the inner wall of the acceleration chamber, and the at least one projection is mounted to at least one of the circumferential surface and the end surface.

3. The micro-texture electrostatic nozzle according to claim 2, wherein the body of each of the micro-bulges has a first height, and the at least one projection mounted on the body of each of the micro-bulges has a second height that is ⅕-⅓ of the first height.

4. The micro-texture electrostatic nozzle according to claim 1, wherein the body of each of the micro-bulges comprises a cylinder having a circumferential surface and an end surface distant from the inner wall of the acceleration chamber, and the at least one projection comprises at least one projection mounted to the circumferential surface and at least one projection mounted to the end surface.

5. The micro-texture electrostatic nozzle according to claim 4, wherein the at least one projection mounted to the circumferential surface of the body of each of the micro-bulges comprises a plurality of projections.

6. The micro-texture electrostatic nozzle according to claim 4, wherein the at least one projection mounted to the end surface of the body of each of the micro-bulges comprises a plurality of projections.

7. The micro-texture electrostatic nozzle according to claim 1, wherein the at least one projection mounted to the body of each of the micro-bulges comprises one of a cylinder and a polygonal prism.

8. The micro-texture electrostatic nozzle according to claim 7, wherein the at least one projection mounted to the body of each of the micro-bulges comprises a plurality of projections, and each of the plurality of projections comprises one of a cylinder and a polygonal prism.

9. The micro-texture electrostatic nozzle according to claim 1, wherein the body of each of the micro-bulges comprises a cylinder having a first diameter, and the at least one projection mounted to the body of each of the micro-bulges comprises a cylinder having a second diameter that is ⅕-⅔ of the first diameter.

10. The micro-texture electrostatic nozzle according to claim 1, wherein at least one projection mounted to at least one of the circumferential surface and the end surface of the body of each of the micro-bulges is extended in a direction perpendicular to the at least one of the circumferential surface and the end surface.

* * * * *